(12) United States Patent
Rasmussen et al.

(10) Patent No.: US 11,723,136 B2
(45) Date of Patent: Aug. 8, 2023

(54) SYSTEMS AND METHODS FOR A MUSIC FEATURE FILE AND COORDINATED LIGHT SHOW

(71) Applicant: Harman Professional Denmark ApS, Aarhus (DK)

(72) Inventors: Niels Joergen Rasmussen, Egaa (DK); Claus Ellevang Hansen, Hornslet (DK)

(73) Assignee: Harman Professional Denmark ApS, Aarhus (DK)

(*) Notice: Subject to any disclaimer, the term of this patent is extended or adjusted under 35 U.S.C. 154(b) by 84 days.

(21) Appl. No.: 17/122,966

(22) Filed: Dec. 15, 2020

(65) Prior Publication Data

US 2021/0195716 A1 Jun. 24, 2021

Related U.S. Application Data

(60) Provisional application No. 62/951,863, filed on Dec. 20, 2019.

(51) Int. Cl.
*H05B 47/12* (2020.01)
*H05B 47/155* (2020.01)
(Continued)

(52) U.S. Cl.
CPC ............ *H05B 47/12* (2020.01); *G06F 3/165* (2013.01); *G10L 25/51* (2013.01); *H04R 1/403* (2013.01); *H04R 3/12* (2013.01); *H05B 47/155* (2020.01)

(58) Field of Classification Search
CPC ....... H05B 47/12; H05B 47/155; G06F 3/165; G10L 25/51; H04R 1/403; H04R 3/12
See application file for complete search history.

(56) References Cited

U.S. PATENT DOCUMENTS 10,685,652 B1\* 6/2020 Cherukuri ............... G10L 25/51
10,789,041 B2\* 9/2020 Kim ....................... G06F 3/165
(Continued)

FOREIGN PATENT DOCUMENTS

| CN | 110582146 A | | 12/2019 | |
|---|---|---|---|---|
| CN | 113015301 A | \* | 6/2021 | ......... G06F 16/4393 |
| WO | 2018066115 A1 | | 4/2018 | |

OTHER PUBLICATIONS

European Patent Office, Extended European Search Report Issued in Application No. 20215039.7, dated May 4, 2021, Germany, 8 pages.
(Continued)

*Primary Examiner* — Abdullah A Riyami
*Assistant Examiner* — Syed M Kaiser
(74) *Attorney, Agent, or Firm* — McCoy Russell LLP

(57) ABSTRACT

Examples are disclosed for systems and methods for providing an automated light show synchronized to one or more music files. In one embodiment, a method comprises generating a music feature file based on selected audio, the music feature file comprising metadata for the selected audio including a plurality of time markers indicating audio events in the selected audio, and automatically controlling one or more lights according to the music feature file. In another embodiment, other approaches and systems are provided to improve a light show or to provide structures and processed files which can be used to improve a light show or provide other features.

19 Claims, 15 Drawing Sheets

(51) Int. Cl.
*G06F 3/16* (2006.01)
*G10L 25/51* (2013.01)
*H04R 1/40* (2006.01)
*H04R 3/12* (2006.01)

(56) References Cited

U.S. PATENT DOCUMENTS

| | | | | |
|---|---|---|---|---|
| 10,789,948 | B1* | 9/2020 | Klein | G06F 16/3329 |
| 10,904,669 | B1* | 1/2021 | Talakoub | H03G 3/32 |
| 2011/0150099 | A1* | 6/2011 | Owen | H04N 21/2662 |
| | | | | 375/240.26 |
| 2013/0236033 | A1* | 9/2013 | Ayres | H05B 47/12 |
| | | | | 381/119 |
| 2014/0063055 | A1* | 3/2014 | Osterhout | G02B 27/017 |
| | | | | 345/633 |
| 2016/0148593 | A1* | 5/2016 | Cohen | G09G 5/005 |
| | | | | 345/428 |
| 2017/0068237 | A1 | 3/2017 | Yamaguchi et al. | |
| 2018/0187447 | A1* | 7/2018 | Gharabegian | E04H 15/28 |
| 2018/0292809 | A1* | 10/2018 | Farnik | G05B 19/416 |
| 2019/0357339 | A1* | 11/2019 | Kim | H05B 47/11 |
| 2020/0090068 | A1* | 3/2020 | Brett | H04L 67/535 |
| 2020/0174734 | A1* | 6/2020 | Gomes | H04R 1/10 |
| 2020/0174735 | A1* | 6/2020 | Gomes | G06F 3/165 |
| 2020/0359210 | A1* | 11/2020 | Akkad | G06F 40/226 |
| 2020/0379715 | A1* | 12/2020 | Won | G10H 1/368 |
| 2021/0048975 | A1* | 2/2021 | Panwar | G06V 10/82 |

OTHER PUBLICATIONS

"Hue Disco official trailer," YouTube Website, Available Online at https://www.youtube.com/watch?v=WjXzdmjPMhU, Oct. 22, 2013, 4 pages.

"Pioneer DJ RB-DMX1 & rekordbox Lighting mode Official Introduction," YouTube Website, Available Online at https://www.youtube.com/watch?v=_ks7YNG4DRs, Jan. 18, 2018, 3 pages.

"Nanoleaf Light Panels—Rhythm Edition!," YouTube Website, Available Online at https://www.youtube.com/watch?v=04lemqmX6ds, Apr. 12, 2018, 3 pages.

European Patent Office, Office Action Issued in Application No. 20215039.7, dated Sep. 15, 2022, Netherlands, 8 pages.

* cited by examiner

SYSTEMS AND METHODS FOR A MUSIC FEATURE FILE AND COORDINATED LIGHT SHOW

CROSS REFERENCE TO RELATED APPLICATIONS

The present application claims priority to U.S. Provisional Application No. 62/951,863, entitled "SYSTEMS AND METHODS FOR A MUSIC FEATURE FILE AND COORDINATED LIGHT SHOW", and filed on Dec. 20, 2019. The entire contents of the above-listed application are hereby incorporated by reference for all purposes.

FIELD

The disclosure relates to methods for controlling one or more lights.

BACKGROUND AND SUMMARY

A "light show" may refer to a method of operating one or more lights, such as a spotlight, a laser, a strobe light, and so on, such that the visual effect of the lights complements one or more characteristics of a music file or a live musical performance. As an example, a light may be synchronized to respond to characteristics of a music file, such as a number of beats per minute (BPM), a time signature, a genre, a plurality of trigger beats marking musical transitions, and the like. Coordinated displays of music and light, as are provided by such light shows, may increase customer satisfaction in bars, night clubs, restaurants, and the like. Typically, a light show is controlled by a human operator, who may program sequences of adjustments to one or more lights corresponding to a pre-determined array of music files or may manually control the lights in real-time. In some examples, lights may be triggered by the beats in the music through various color presets, using a built in microphone.

In order to improve an automated light show synchronized with one or more music files, various embodiments are disclosed, one of which is for a music feature file (MFF), which may provide relevant metadata for a music file, and a lighting control apparatus. An example system for providing automated light shows, which may adjust one or more lights based on metadata in the MFF and optional user inputs, comprises a music feature file, one or more lights, and at least one computerized device, such as a laptop, a mobile phone, or a specialized lighting controller, the at least one computerized device communicatively coupled to, or integrated with, the one or more lights.

In one embodiment, a method comprises generating a music feature file based on selected audio, the music feature file comprising metadata for the selected audio including a plurality of time markers indicating audio events in the selected audio, and automatically controlling one or more lights according to the music feature file.

In another embodiment, other approaches and systems are provided to improve a light show or to provide structures and processed files which can be used to improve a light show or provide other features.

BRIEF DESCRIPTION OF THE DRAWINGS

The disclosure may be better understood from reading the following description of non-limiting embodiments, with reference to the attached drawings, wherein below.

DETAILED DESCRIPTION

Figure 1:
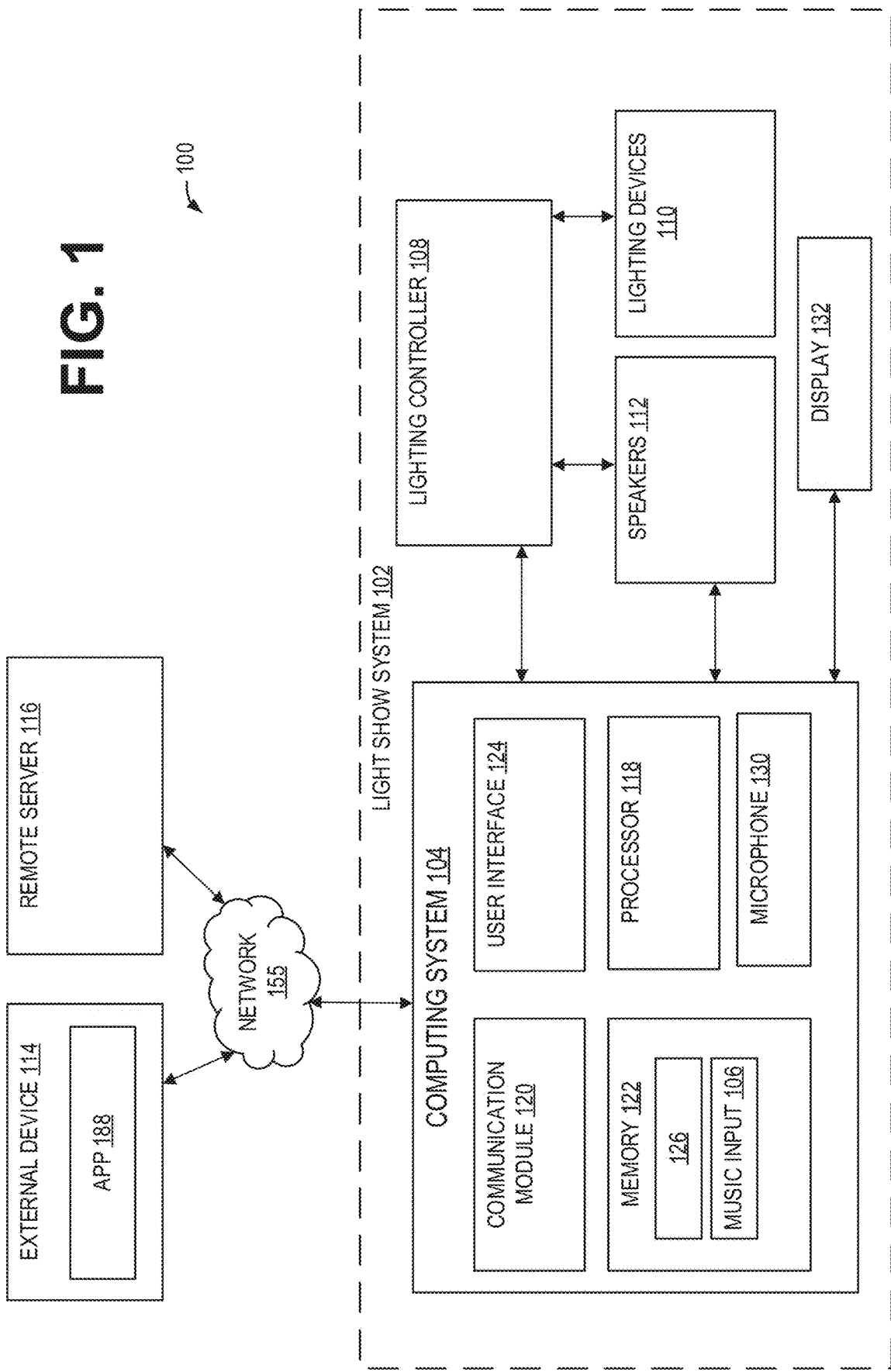
FIG. 1 is a block diagram of a light show system in accordance with one or more embodiments of the present disclosure.

FIG. 1 shows a block diagram of an example light show system 102 and related elements with which light show system 102 is in communication. Light show system 102 may provide automated light shows based on metadata in a music feature file (MFF), as described in FIG. 2.

Light show system 102 may include a computing system 104, a music file 106, a lighting controller 108, one or more lights 110, and one or more speakers 112. It is to be understood that any suitable number and/or combination of interconnects may be used to provide communication between various components of light show system 102 and related elements, including but not limited to Ethernet, Bluetooth, Wi-Fi, Controller-Area-Network (CAN), Media Oriented Systems Transport (MOST) buses, and so on. Further, light show system 102 may communicate with a network 155 wirelessly. The network 155, which may be part of a server or other device, may communicate with an external device 114 and one or more remote servers 116, via a wireless and/or wired connections. In one example, external device 114 is a mobile phone, which may include an app 188. App 188 may provide user inputs (e.g., user inputs regarding an automated light show) via a wireless connection with the computing system.

Computing system 104 may include one or more processors including a processor 118, a communication module 120, a user interface 124, a non-volatile memory 122, and a volatile memory 126. Computing system 104 may be a standalone device (e.g., a laptop, a desktop computer, a mobile phone, and so on), while in other examples computing system 104 may be integrated with another component of light show system 102. As an example, computing system 104 may be integrated with lighting controller 108. As another example, computing system 104 may be integrated with a light or a speaker.

A non-volatile memory 122, may be included in the computing system 104 to store data such as instructions executable by the processor 118 in non-volatile form. The non-volatile memory 122 may store application data to enable the computing system 104 to run an application for connecting to a cloud-based server and/or collecting information for transmission to the cloud-based server. The application may retrieve information gathered by input devices (e.g., a user interface 124), devices in communication with the computing system (e.g., a mobile device connected via a Bluetooth link), and so on. Non-transitory storage devices, such as non-volatile memory 122 and/or volatile memory 126, may store instructions and/or code that, when executed by the processor 118, controls the computing system 104 to perform one or more of the actions described in the disclosure.

Processor 118 may execute programs stored in memory 122 of computing system 104, control input/output, and interface with the other components of light show system 102. Further, communication module 120 of computing system 104 may output data to the lighting controller 108, the speakers 112, and the lights 110, while also receiving data input from other the music input 106, the external devices 114, the remote server 116, and the lighting controller 108.

User interface 124 of computing system 104 may enable the computing system to receive information from users, such as user preferences for light shows. In one example, a smartphone provides the user interface for light show system 102, while in other examples, a dedicated touch-screen, keypad, or other input method allows a user to transmit preferences and/or commands to computing system 104. The display may be a touch-screen display. Additionally or alternatively, the user interface may include an input hardware element, such as an input switch. The user interface may be electrically connected to the computing system 104.

The controller may include a digital signal processor DSP with a static or adaptive algorithm solution, a graphic processing unit GPU, a system-on-a-chip SOC, and/or another integrated circuit IC. For example, the controller may include frequency impulse response (FIR) control filters and/or adaptive algorithm controls that alter or re-calculate the FIR control filters. In other examples, displays may not provide a user interface, but may provide a televisual screen for projecting images (e.g., a music video synchronized to a music file).

In some embodiments, computing system 104 may be a mobile device. The mobile device may include a smart phone, a tablet, a laptop computer, a portable media player, and/or any suitable mobile computing system, and may be connected to other components of lighting system 102 via a communication link. The communication link may be wired (e.g., via Universal Serial Bus [USB], Mobile High-Definition Link [MHL], High-Definition Multimedia Interface [HDMI], and so on) or wireless (e.g., via BLUETOOTH, WI-FI, Near-Field Communication [NFC], and so on) and configured to provide two-way communication between the mobile device and the lighting system 102. For example, the communication link may provide control and/or sensor signals from the mobile device to other components of the lighting system.

Computing system 104 may receive a music input 106. In some examples, the music input may be a music file saved locally in memory non-volatile memory 122, or may be provided via an AUX cable connection, a USB connection, a Bluetooth connection, and so on, from an external device 114. As another example, the music input may be a streaming service, wherein a remote server 116 digitally streams a music file on command. In some examples, streaming a music file may include receiving a complete music file, while in other examples, streaming a music file may include receiving a plurality of packets from a remote server. In some embodiments, the computing system 104 may send the music input 106 to one or more of the plurality of speakers 112 in order to provide a synchronized audio-visual experience.

In some embodiments, the lighting controller 108 may adjust the lights 110 according to instructions received from the computing system 104. However, in other embodiments, a lighting controller may not be included in lighting system 102, and the computing system 104 may directly adjust one or more lights 110. Further, in some embodiments the lighting controller 108 may transmit an audio signal to the speakers 112 according to instructions received from the computing system 104, while in other embodiments, the computing system 104 may directly transmit an audio signal to the speakers 112.

The speakers 112 may control a volume of audio output, a distribution of sound among the individual speakers of a plurality of speakers, an equalization of audio signals, and/or any other aspect of the audio output. In some examples, one or more of the speakers 112 may include a computing system, such as computing system 104. Further, the lights 110 may include one or more lights, and may include a variety of light types, such as a spotlight, a globe light, a laser, a strobe light, and so on. In some examples, one or more of the lights may include a computing system, such as computing system 104.

Figure 2:
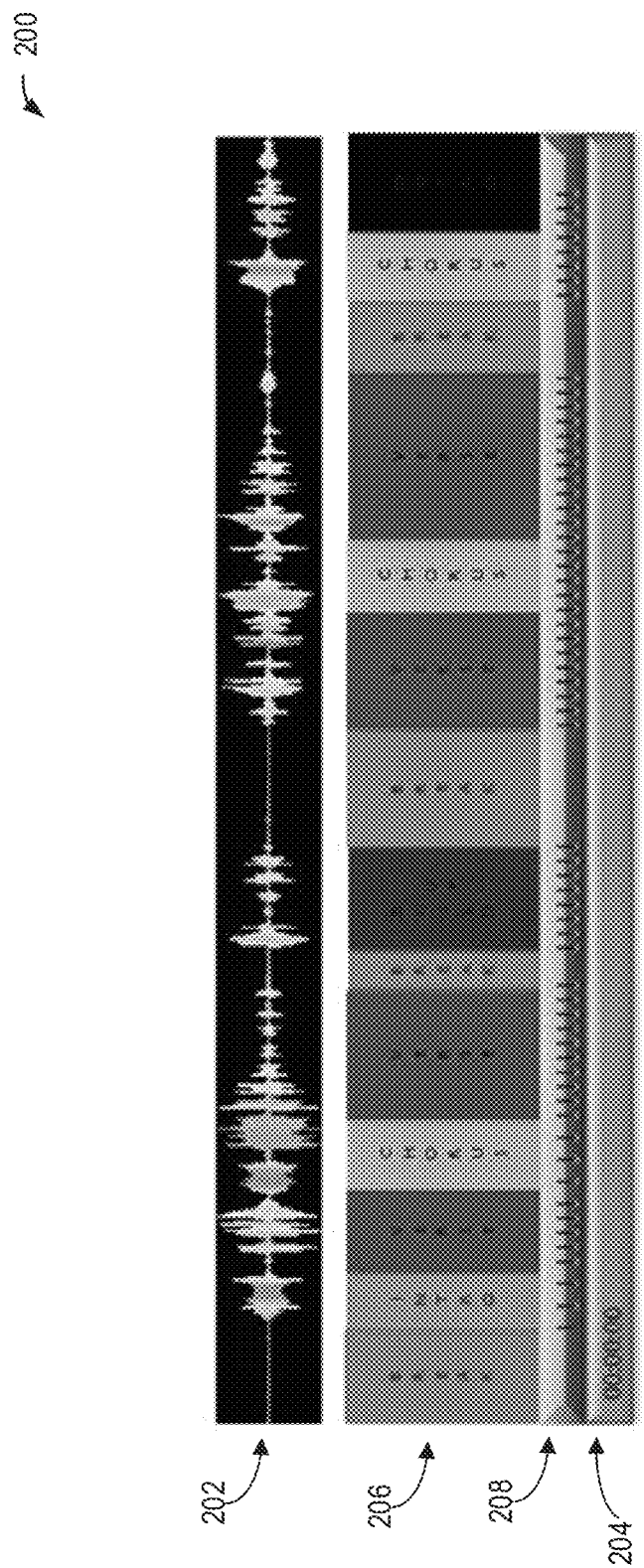
FIG. 2 shows a schematic depiction of a music feature file (MFF) protocol, according to at least one example of the present disclosure.

FIG. 2 shows a schematic representation of an example protocol governing a music feature file (MFF) 200. As an example, MFF 200 may be a file containing characteristics of the music file, along with one or more time markers aligned with song events. The characteristics of the music file may include a time signature, a number of beats per minute (BPM), a musical key, a genre, and the like. Further, a timeline 204 may correspond to Music file 202. In example MFF 200, a plurality of song events, such as song events 206 may include a song beginning, a song end, a transition between verse and chorus, a transition between chorus and verse, a transition between verse and bridge, a climactic moment within the song (referred to herein as a "drop"), and so on. In one example, the song events 206 are categorized into a break, an intro, a verse, a chorus, and a build-up. It will be appreciated that other categorizations may be included and/or excluded from the song events 206. MFF 200 may further include a plurality of trigger beats, such as trigger beats 208, which may index song events 206 to timeline 204. The MFF 200 may be supported multiple times during the track. In some embodiments, the MFF may be combined with the corresponding music file into a single file protocol, while in other embodiments, the MFF and the MP3 may be separate file protocols, and may be aligned by a separate controller. MFF 200 may be generated based on a music file, such as a corresponding music file 202. In other examples, MFF 200 may be generated based on another type of music file, such as a WAV file or an MP4 file. Further, in some examples, MFF 200 may be generated in real-time, responsive to an analog or streaming music source.

Figure 3A:
FIG. 3A shows a schematic depiction of a MFF protocol including packets sent at pre-determined intervals throughout a music file, according to at least one example of the present disclosure.

FIG. 3A shows schematic representation of another example MFF 300. MFF 300 may be generated based on corresponding music file 302. Further, MFF 300 comprises a plurality of packets 304, each of the plurality of packets 304 including a complete set of metadata for music file 302, such as a time signature, a BPM, a musical key, a genre, a plurality of song events, a plurality of trigger beats, a timeline, and an indication of location relative to music file 302. With a MFF comprised of timed packets including the complete set of metadata for the music file, a light show system may use data from the entire music file after receiving one packet.

Figure 3B:
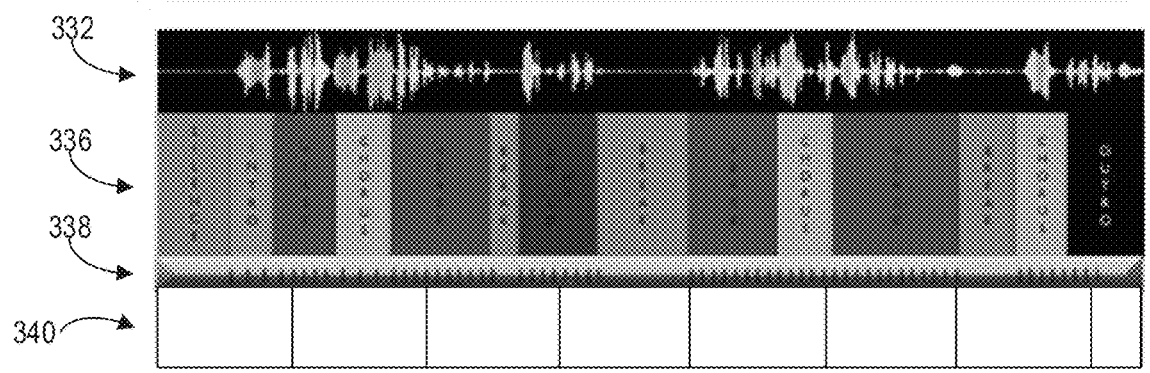
FIG. 3B shows a schematic depiction of another MFF protocol including a karaoke video, according to at least one example of the present disclosure.

Next, FIG. 3B shows a schematic representation of another example MFF 330. The MFF 330 may be generated based on a corresponding music file 332, and comprises a plurality of song events 336 and a plurality of trigger beats 338. Further, the MFF 332 includes a karaoke video 340, which may be aligned with the music file 332 such that a music video and song lyrics are timed to correspond with music file 332. The karaoke video 340 may comprise one or more of lyrics, a background, a singer, or the like, wherein the karaoke video 340 is segmented based on one or more of the plurality of song events 336 and the plurality of trigger beats 338.

Figure 3C:
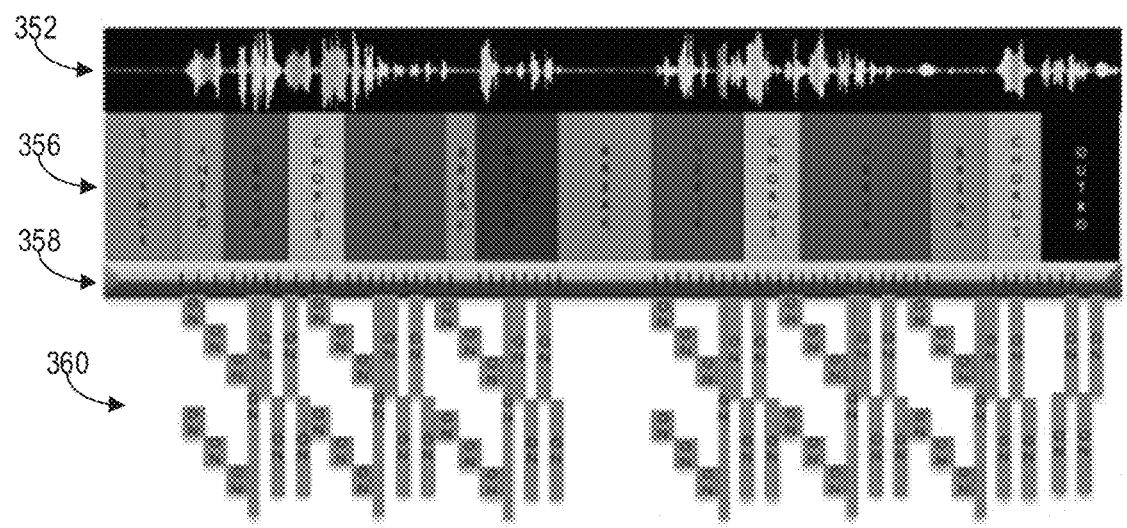
FIG. 3C shows a schematic depiction of yet another MFF protocol including a light timing, according to at least one example of the present disclosure.

Next, FIG. 3C shows a schematic representation of another example MFF 350. The MFF 350 may be generated based on a corresponding music file 352, and comprises a plurality of song events 356 and a plurality of trigger beats 358. Further, the MFF may include a timing 360 for specific light show devices (e.g., lights and speakers) corresponding to trigger beats and song events. In the embodiment of FIG. 3C, MFF 350 may be a protocol combining the music file and the music feature file, which may improve processing time while providing a light show. The timing 360 may provide instructions for one or more lights, such as lights included in the light show system 102 of FIG. 1. The timing 360 may be used to activate or deactivate one or more lights based on the plurality of song events 356 and/or the plurality of trigger beats 358. In one example, as a tempo of the song increases (e.g., increased number of trigger beats within a predetermined duration), the timing 360 may signal to activate more lights and/or to increase an intensity of activated lights. Additionally or alternatively, as the tempo decreases, such as during a break in the plurality of song events 356, the timing i360 may signal to deactivate the lights.

Figure 4:
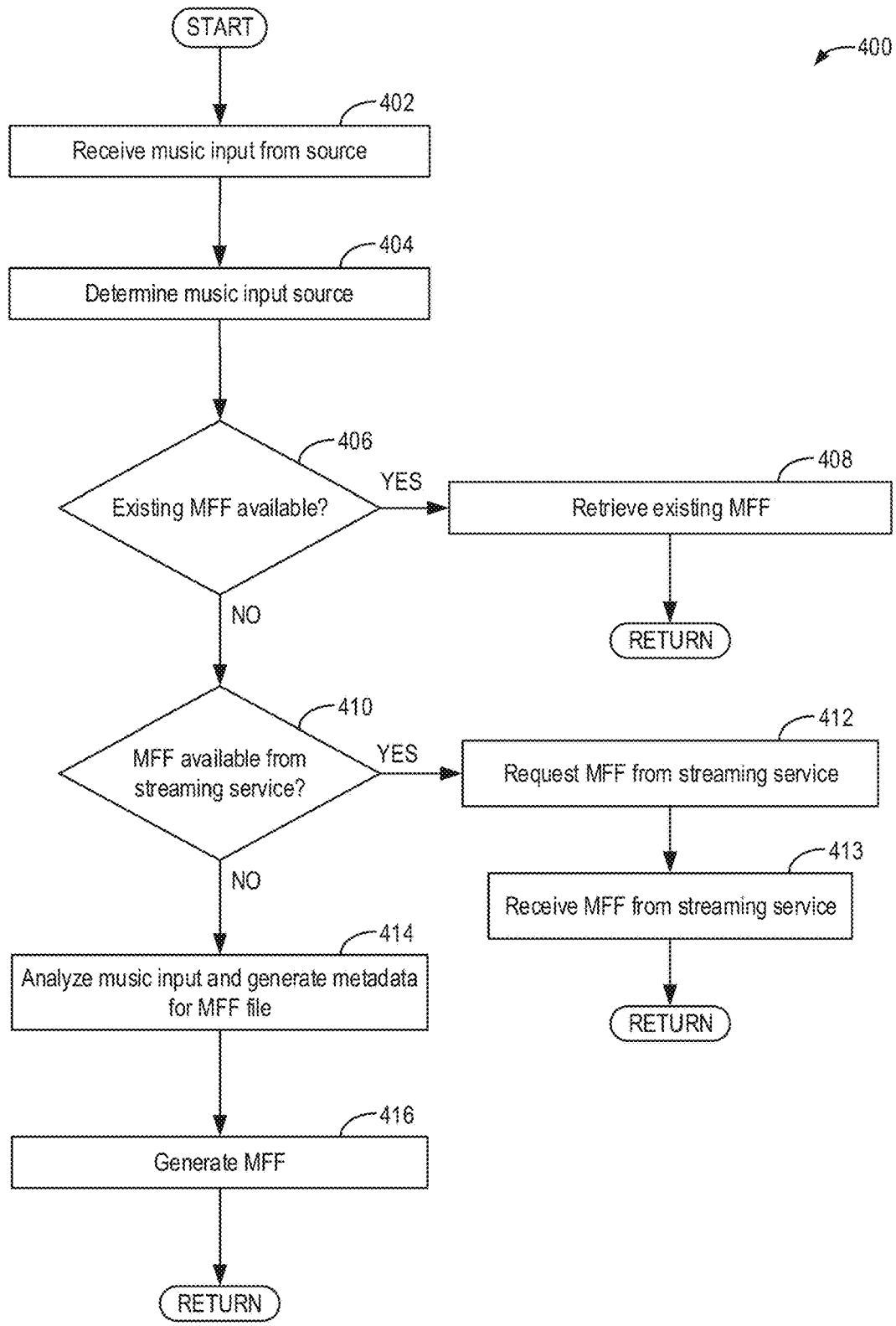
FIG. 4 shows a flow chart of a method according to at least one example of the present disclosure.

Turning now to FIG. 4, it shows a flow chart of an example method 400 for acquiring a music feature file (MFF). The method 400 may be performed by a computing system, such as computing system 104 of FIG. 1. Instructions stored on memory of the computing system 104 may be executed and enable the computing system to acquire the music feature file.

At 402, method 400 includes receiving a music input. In some examples, the music input may be a music file stored in controller memory. In another example, the music input may be a music file stored on an external device, such as an external hard drive, a CD-ROM, a DVD, and so on. In yet another example, the music input may be a streaming service, which may provide the music file to the controller in real-time. In still another example, the music input may be an analog signal, provided via an AUX cable and/or a microphone. For example, an AUX cable connected to an independent music player (e.g., a record player, a radio, a portable music player, or the like) may deliver an analog music file to the controller in real time. As another example, the controller may receive an analog audio signal via a microphone, such as microphone 130 of FIG. 1.

At 404, method 400 includes determining a music input source. For example, the controller may determine whether the music file is available as a retrievable file in local memory or in an external device. The controller may further determine whether the music file is being provided by a streaming service. The controller may further determine whether the music file is being provided via an AUX cable and/or a microphone. For example, if the music input source is not a music streaming service, method 400 may determine that the music input source is a local file or an analog signal.

At 406, method 400 includes determining whether an existing MFF is available for the music file. In one example, the MFF may have been generated and saved previously. As another example, the MFF may have been downloaded onto the computing system via another source. As yet another example, the MFF may be stored on the external device (e.g., an external hard drive, a personal computer, and so on), and may be available for download.

If method 400 determines that the MFF corresponding to the music input is available ("YES"), method 400 proceeds to 408. At 408, method 400 retrieves the existing MFF corresponding to the music input. After 408, method 400 returns.

Referring again to 406, if method 400 determines that an existing MFF is not available ("NO"), method 400 proceeds to 410. At 410, method 400 determines if the MFF is available from a streaming service. For example, if the music input source is a streaming service, the MFF may be available for download or for streaming via the streaming service.

If method 400 determines that the existing MFF is available from a streaming service ("YES"), method 400 proceeds to 412. At 412, method 400 requests the MFF from the streaming service. Continuing at 413, method 400 receives the MFF from the streaming service. In some examples, the streaming service may transmit packets, such as packets 304 of FIG. 3A, at pre-determined intervals during transmission of the music file. In another example, the streaming service may transmit a complete MFF, such as the MFF 200 of FIG. 2, when computing device 104 begins streaming the music file. After 413, method 400 returns.

Referring again to 410, if method 400 determines that the MFF for the corresponding music input source is not available through a streaming service ("NO"), method 400 proceeds to 414. At 414, method 400 analyzes the music input and generates metadata for the MFF file. As an example, analyzing the music input may include determining song metadata such as a length, a number of BPM, a tempo, a genre, a plurality of song events, a mood, and a musical key. In one example, the music file is an MP3, and method 400 may input the MP3 file into one or more look-up tables, functions, or algorithms, which may output the song characteristics, for example. In one example, the music input is an analog music signal (e.g., via an AUX connection or a microphone), and method 400 may analyze the music file in real time to determine the song characteristics. For example, method 400 may input the analog music signal into one or more look-up tables, function, or algorithms, which may output the song characteristics. If the music input is an analog signal, the MFF protocol may include a plurality of discrete packets (e.g., such as the MFF protocol of FIG. 3A), and may update the song characteristics in real-time based on changes in the analog music signal.

At 416, method 400 generates the MFF. The MFF may be generated by storing the song metadata determined at 412 according to a pre-determined protocol, such as the MFF protocol 200 of FIG. 2. In some examples, the MFF may be transmitted to a lighting controller, and additionally or alternatively be saved to controller memory. In other examples, the MFF may be transmitted to a remote server, such as remote servers 116 of FIG. 1. After 414, method 400 returns.

Figure 5:
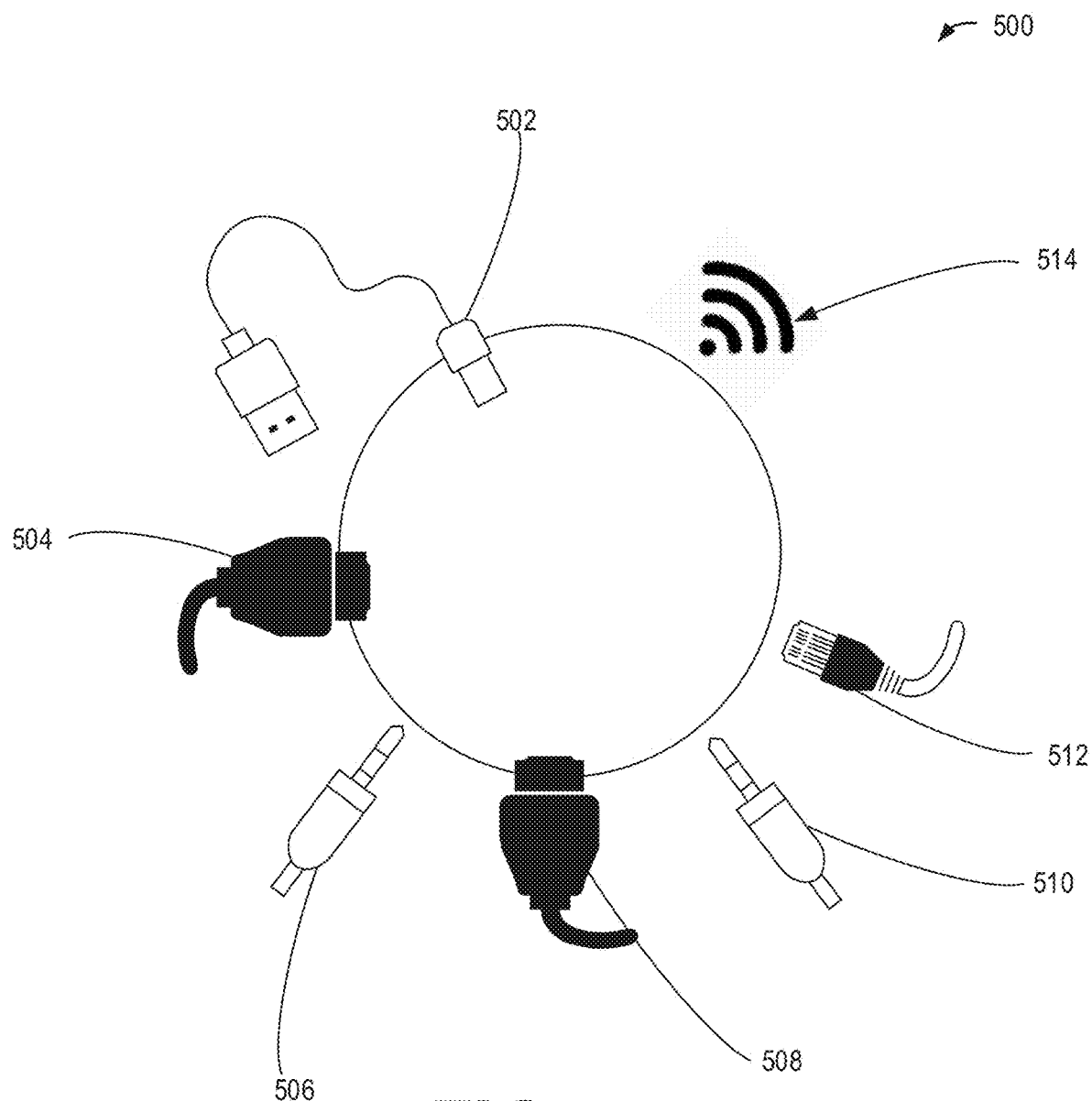
FIG. 5 shows a schematic view of an Integrated Light Show Hub according to at least one example of the present disclosure.

FIG. 5 shows a view of an Integrated Light Show Hub 500, which may provide an interface between a music source, a plurality of speakers, and a plurality of lights. In some examples, lighting controller 108 of FIG. 1 may be an Integrated Light Show Hub. The Integrated Light Show Hub 500 includes a computing system, and may communicate with other devices, such as the music source, a speaker, and a light, via one or more communication links. The communication link may be wired (e.g., via Universal Serial Bus [USB], Mobile High-Definition Link [MHL], High-Definition Multimedia Interface [HDMI], and so on) or wireless (e.g., via BLUETOOTH, WI-FI, Near-Field Communication [NFC], and so on) and configured to provide two-way communication between the Integrated Light Show Hub 500 and other devices. As shown in FIG. 5, Integrated Light Show Hub 500 includes a USB connector 502, an outgoing HDMI connector 504, an AUX cable 506, an incoming HDMI connector 508, a microphone connector 510, a LIGHTNING connector 512, and a WI-FI antenna 514. In one example, the Integrated Light Show Hub may receive a MFF from a music source, such as via a wireless connection, and may adjust a signal to one or more lights and one or more speakers to provide a synchronized lighting show. In another example, the Integrated Light Show Hub may receive a music file, such as a MP3, from a music source, and may generate a MFF according to the method of FIG. 4. After generating a MFF, the Integrated Light Show Hub 500 may adjust a signal to one or more lights and to one or more speakers to provide a synchronized lighting show. In yet another example, the Integrated Light Show Hub may transmit the MFF to one or more lights and to one or more speakers, and may provide time synchronization between each device.

In the embodiment of FIG. 5, the Integrated Light Show Hub 500 may include beat, phrase, and key recognition, video color picking, and mapping information. Further, the Integrated Light Show Hub 500 of FIG. 5 may include a processor capable of algorithmic processing, speech recognition, and control of a mobile application. For example, the Integrated Light Show Hub 500 may receive a music file via an analog music signal (e.g., from the AUX connector 506), and may provide a light show based on the analog music signal in real-time. The Integrated Light Show Hub 500 may apply predictive learning algorithms to the analog music signal to determine characteristics of the music file, such as a number of BPM and a genre. The Integrated Light Show Hub may transmit packets to one or more connected devices at a pre-determined interval, such as every 20 milliseconds (ms), for example, with an average latency of 20 ms, for example. Further, the Integrated Light Show Hub may receive packets from one or more connected devices at a pre-determined interval, such as every 5 seconds, for example.

Figure 6:
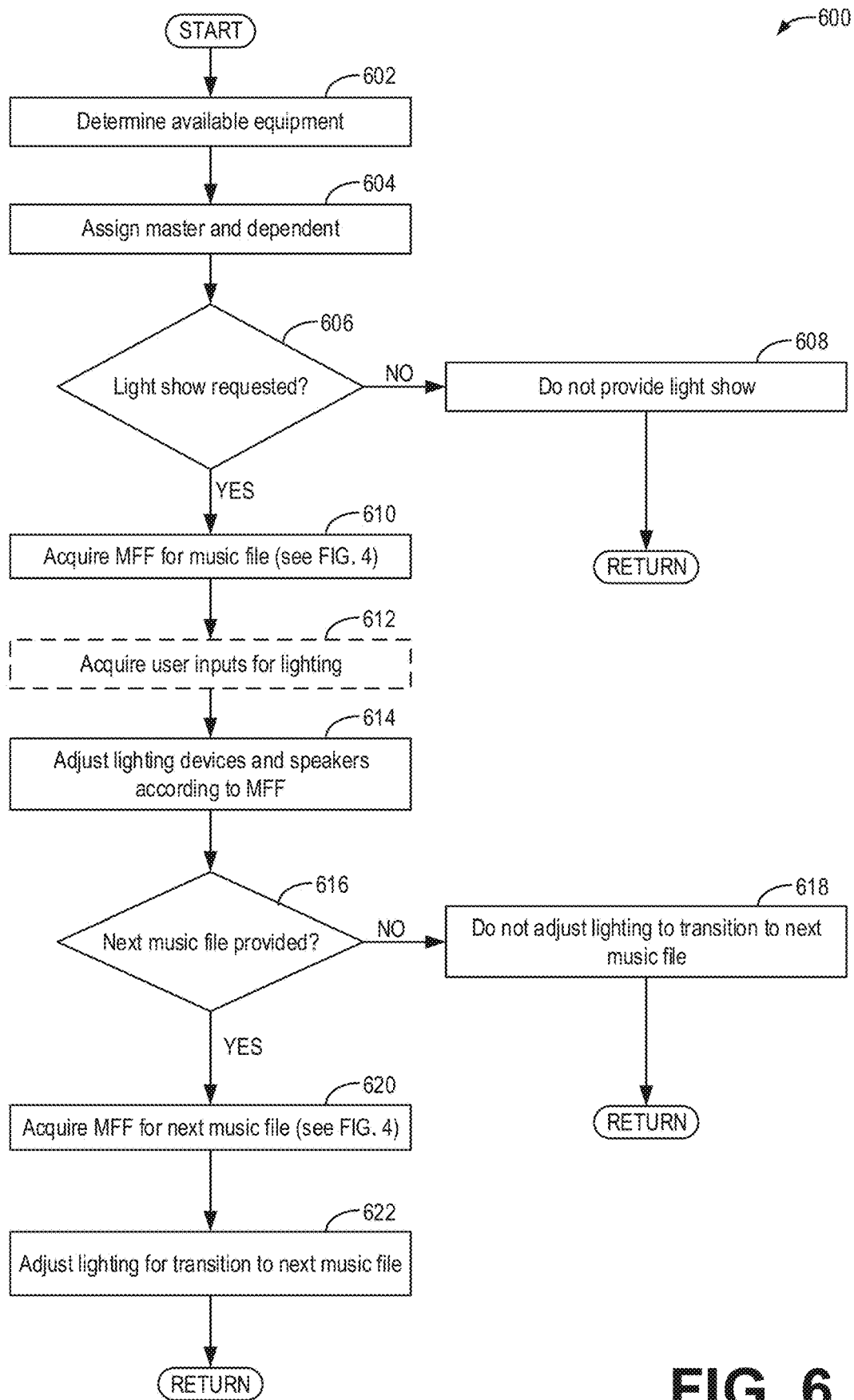
FIG. 6 shows a flow chart of a method for providing an automated light show according to at least one example of the present disclosure.

Next, FIG. 6 shows an example method for providing an automated light show based on a music input and a corresponding music feature file (MFF). The method 600 may be performed by a light show system such as light show system 102 of FIG. 1, which may include a computing system such as computing system 104. The light show system may further include a lighting controller, which may be an Integrated Light Show Hub, such as the Integrated Light Show Hub show in FIG. 5. In examples including an Integrated Light Show Hub, the computing system may be integrated with the Integrated Light Show Hub. In examples not including an Integrated Light Show Hub, the computing system may be integrated into the lighting controller, a mobile device, a light, or another external device.

At 602, method 600 includes determining available equipment included in the light show system. For example, a light show system may include a plurality of speakers and a plurality of lights. In some examples, a light show system may further include a monitor for a karaoke video, a mobile device, a lighting controller (e.g., an Integrated Light Show Hub), and so on. Further, method 600 may determine the characteristics of the available equipment, such as a type of light (e.g., strobe, laser, spotlight, and so on), a connection method (e.g., wired, Bluetooth, WiFi, and so on), a color-change ability, a frequency, a location, pan and tilt area and an intensity.

At 604, method 600 includes assigning a master device and one or more dependent devices (e.g., slave devices). For example, if an Integrated Light Show Hub is detected at 602, the Integrated Light Show Hub may be designated as the master device. If an Integrated Light Show Hub is not detected at 602, the first device including a processor to respond may be designated as the master device. All devices in the light show system not designated as the master device may be designated as dependent devices. Thus, method 600 may be executed by a controller included in a speaker, an Integrated Light Show Hub, or a light. However, in some examples, a separate computing device may be designated the master, and may execute method 600.

At 606, method 600 determines whether a light show is requested for a provided music file. For example, a user input may trigger a request for a light show. For example, a user may press a key or button in a user-interface connected to the lighting system, and may request a light show. In some embodiments, selecting a music file may trigger a request for a light show. For example, a user input may trigger a first music file selection, and a light show may be automatically provided for a selected music file.

If method 600 determines that a light show is not requested ("NO"), method 600 proceeds to 608. At 608, method 600 does not provide a light show. For example, the light show system may not acquire a MFF for a corresponding music file, may not adjust a light according to the MFF, and may not transmit a music signal to a speaker. After 608, method 600 returns.

However, referring again to 606, if method 600 determines that a light show is requested ("YES"), method 600 proceeds to 610. At 610, method 600 acquires a MFF for the first music file. For example, method 600 may acquire the MFF for the first music file according to the method 400 described hereinabove.

Continuing at 612, method 600 optionally acquires user inputs for lighting. In some embodiments, a user may modify a number of light show pre-sets, which may change the method by which lights are adjusted. For example, a user may enter a color preference by pressing a button on a user interface, which may modify an algorithm for providing the light show. A user may further input a number of lights, a desired efficiency, a desired pulsing, and the like. For example, if the user inputs to a relatively high desired efficiency, then the light show may reduce a light intensity and number of lights activated compared to a light show with a lower desired efficiency.

Continuing at 614, method 600 adjusts one or more lights and/or speakers according to the metadata in the MFF for the first music file. If a user input was acquired at 612, method 600 may also adjust one or more lights based on the user input. In some examples, the master device may directly adjust the one or more lights and/or speakers. In other examples, if one or more dependent devices includes a computing system, the master device may transmit a protocol for adjustment, referred to herein as a "lighting feature file" (LFF), to the one or more dependent devices. Based on metadata in the LFF, a controller of each dependent device with a computing system may make a series of adjustments. Thus, in some examples, adjusting one or more lights and/or speakers according to the metadata in the MFF for the first file at 614 may include transmitting a LFF to one or more dependent devices. The LFF may include general instructions for adjusting a light show device, a position of the dependent device relative to the master device, and so on. Additionally or alternatively, colors, pulsations, brightness, contrast, intensity, and the like may be adjusted. Intensity may correspond to a color, such that a dark red when may be more intense than a light red. Brightness may refer to a visual sensation of a light. For example, a yellow light may be brighter than a purple light. In one example, the yellow light illuminates a greater area than the purple light. Contrast may refer to an amount of blending between light and dark areas. For example, low contract may include a greater amount of blending between light and dark areas relative to high contrast, which may more clearly define light and dark areas.

At 616, method 600 determines whether a second music file is provided. For example, a user may request a light show that accompanies a sequence of music files. A user may provide a list of files before beginning the light show, or may add a new music file to the sequence of music files while the first music file is playing.

If the method determines that the second music file is not provided ("NO"), method 600 proceeds to 618 and includes not adjusting lighting to transition to the next music file. For example, method 600 may not adjust a tempo or color of lights to provide a transition between the first music file and the second music file. Method 600 then returns.

However, referring again to 616, if method 600 determines that a next music file is provided ("YES"), method 600 proceeds to 620 and acquires the MFF for the next music file. For example, method 600 may acquire the MFF for the next music file according to the method 400 described hereinabove with regard to FIG. 4.

After acquiring the MFF for the next music file, method 600 continues to 622. At 622, method 600 adjusts one or more lights to provide a transition between the first music file and the second music file. For example, the method may input a MFF corresponding to the first music file and a MFF corresponding to the second music file into one or more look-up tables, algorithms, or functions, which may output one or more adjustments for transitioning between the first music file and the second music file. In some embodiments, the method may include fading out the first music file on the speakers, and fading in the second music file on the speakers, in order to provide a more satisfying transition. After 622, method 600 returns.

Figure 7:
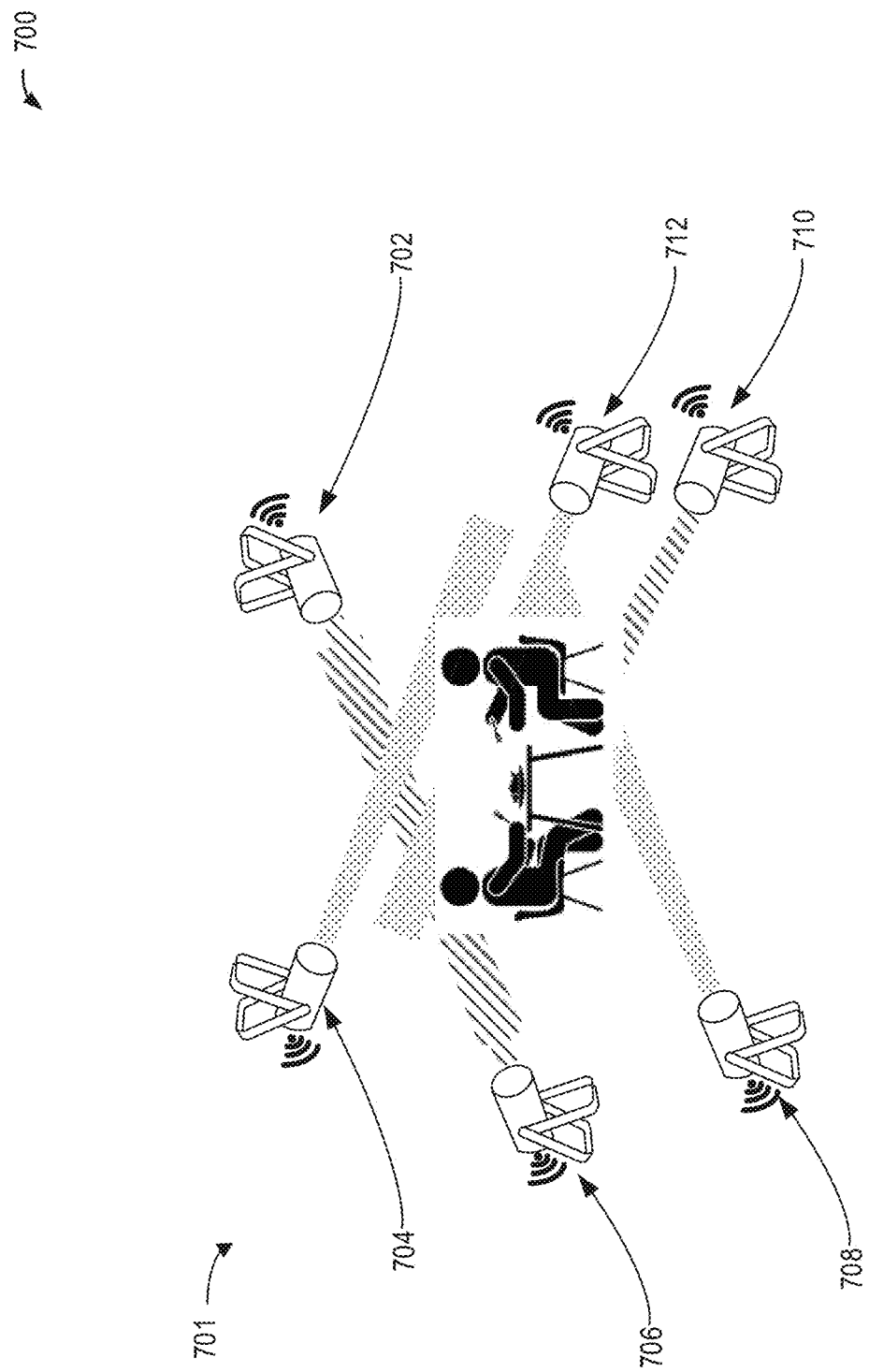
FIG. 7 shows an example configuration of a light show system according to at least one example of the present disclosure.

FIG. 7 is a view of a light show system 700. Light show system 700 includes a plurality of lights 701, including a master light 702 and dependent lights 704, 706, 708, 710, 712. In the example of FIG. 7, the master light 702 may broadcast an automated light show. The automated light show may be a pre-determined sequence of adjustments to the master light 702 and the dependent lights, for example. In another example, the automated light show may be generated based on one or more music feature files.

The plurality of lights 701 are depicted as emitting differently colored light beams. In one example, a striped beam represents a first color and the dotted beam represents a second color, different than the first color. It will be appreciated that less than or greater than two color may be emitted by the plurality of lights 701 based on the acquired MFF.

Figure 8:
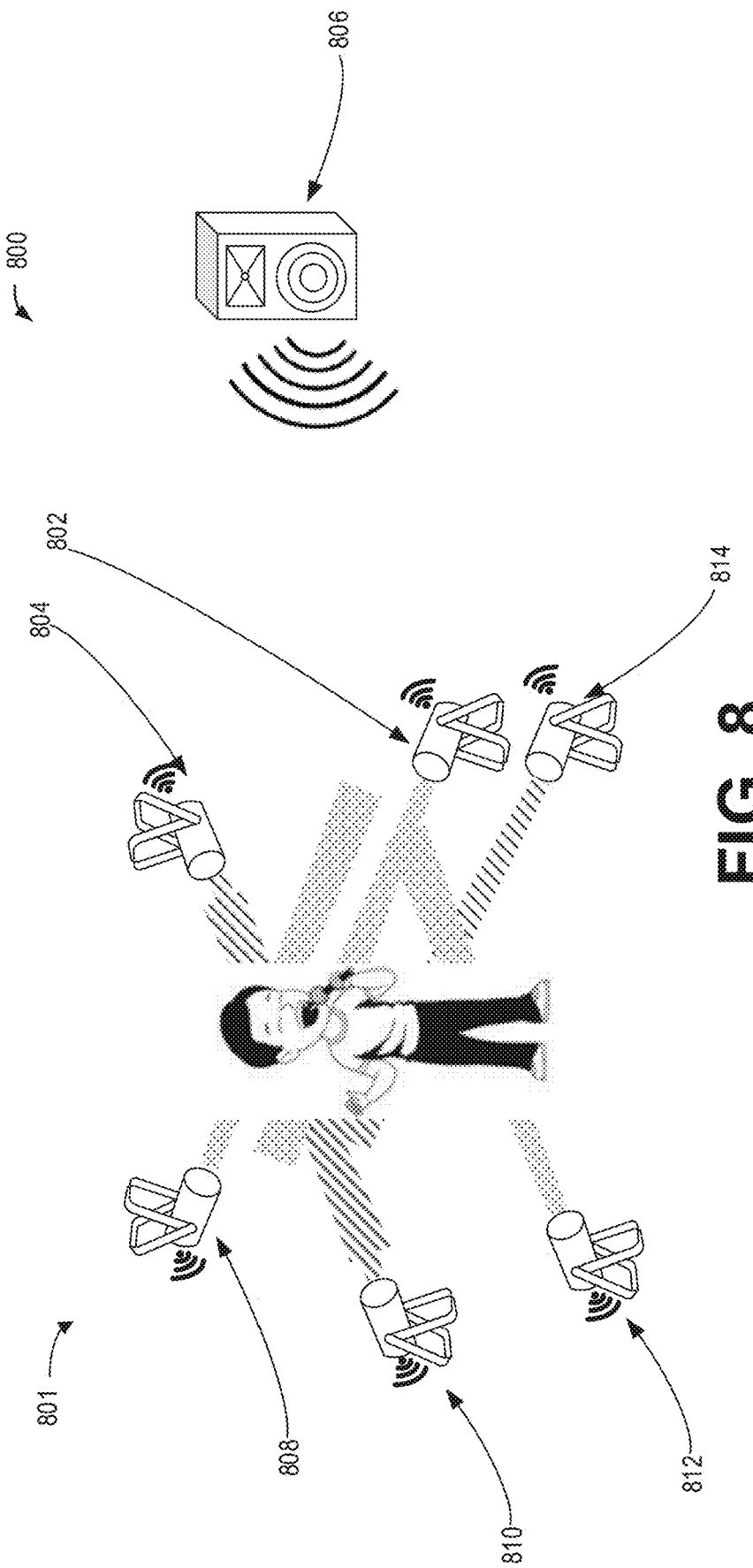
FIG. 8 shows another example configuration of a light show system including a speaker, according to at least one example of the present disclosure.

FIG. 8 is a view of a light show system 800, including a plurality of lights 801 and an audio source 806. In one example, the audio source 806 is a speaker 806. The plurality of lights 801 includes a master light 802, and dependent lights 804, 808, 810, 812, and 814. In the example of FIG. 8, the master light 802 may broadcast an automated light show separately from the speaker 806. That is to say, the speaker 806 and the plurality of lights 801 may not be in communication. However, each of the speaker 806 and the plurality of lights 801 are instructed to play an identical audio file, wherein the master light 802 signals to the dependent lights 804, 808, 810, 812, and 814 to play a light show in conjunction with the MFF while the speaker 806 plays an audio file. In one example, audio of the audio file is identical to audio of the MFF.

Figure 9:
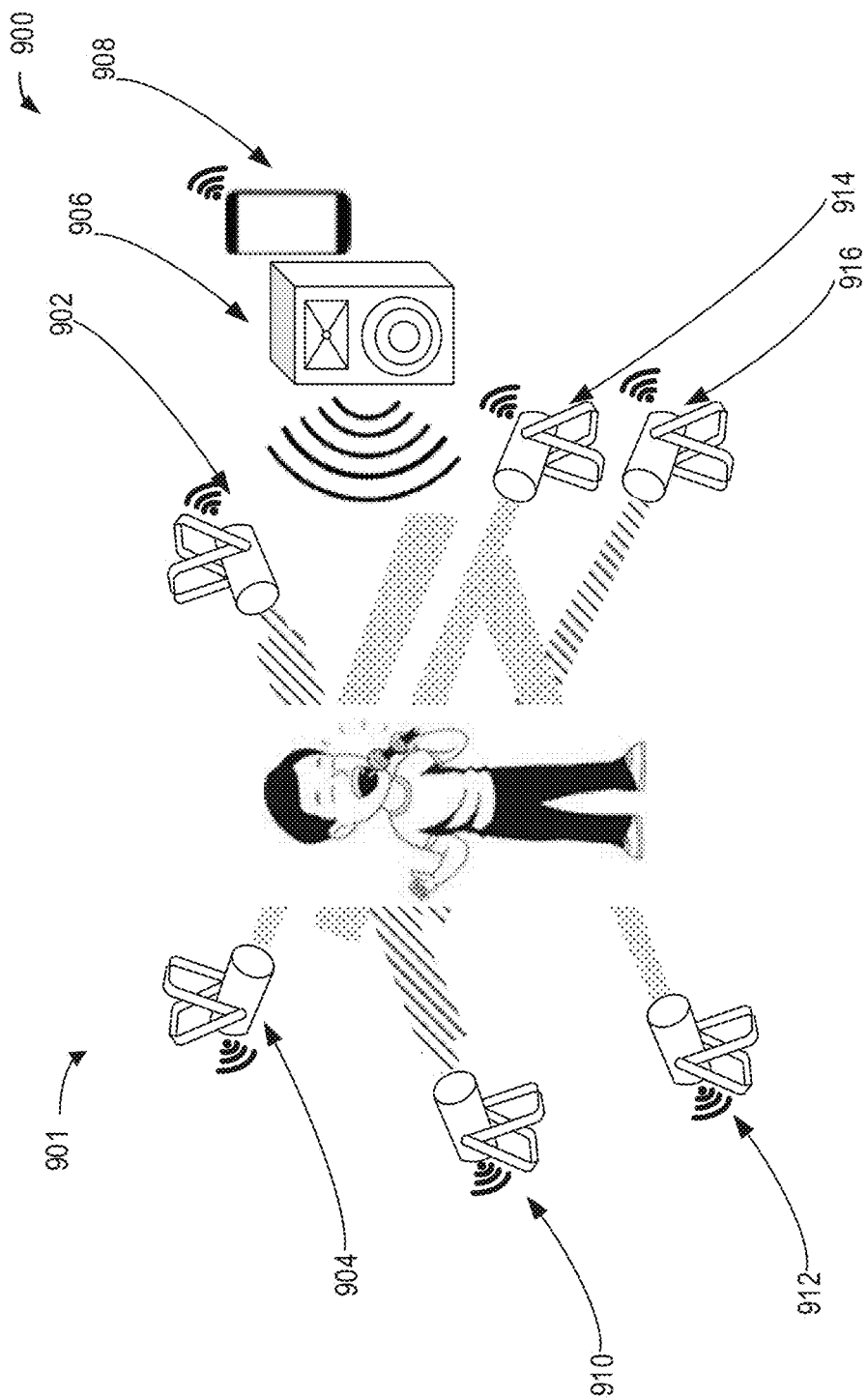
FIG. 9 shows another example configuration of a light show system including a speaker and a mobile device, according to at least one example of the present disclosure.

FIG. 9 is a view of a light show system 900, including a plurality of lights 901, a speaker 906, and a mobile device 908. The plurality of lights 901 includes a master light 902, and dependent lights 904, 910, 912, 914, and 916. The mobile device 908 may include a smart phone, a tablet, a laptop computer, a portable media player, and/or any suitable mobile computing system. The mobile device 908 may be connected to the master light 902 and the speaker 906 via a communication link. The communication link may be wired or wireless, and may be configured to provide two-way communication between the mobile device 908, the master light 902, and the speaker 906. In the example of FIG. 9, the mobile device 908 may transmit a MFF and/or a series of lighting adjustments to the master light 902, and may further transmit a music file to the speaker 906. The master light 902 may broadcast an automated light show to the plurality of dependent lights 904 based on one or more music files and/or MFFs provided by the mobile device 908, and may be calibrated to correspond to the music file as transmitted by the speaker 906. Further, a user may adjust parameters of the automated light show via mobile device 908. Similar to the example of FIG. 8, the speaker 906 is not in communication with the mobile device 908 and/or the plurality of lights 901. As such, the speaker 906 does not include wireless communication abilities.

Figure 10:
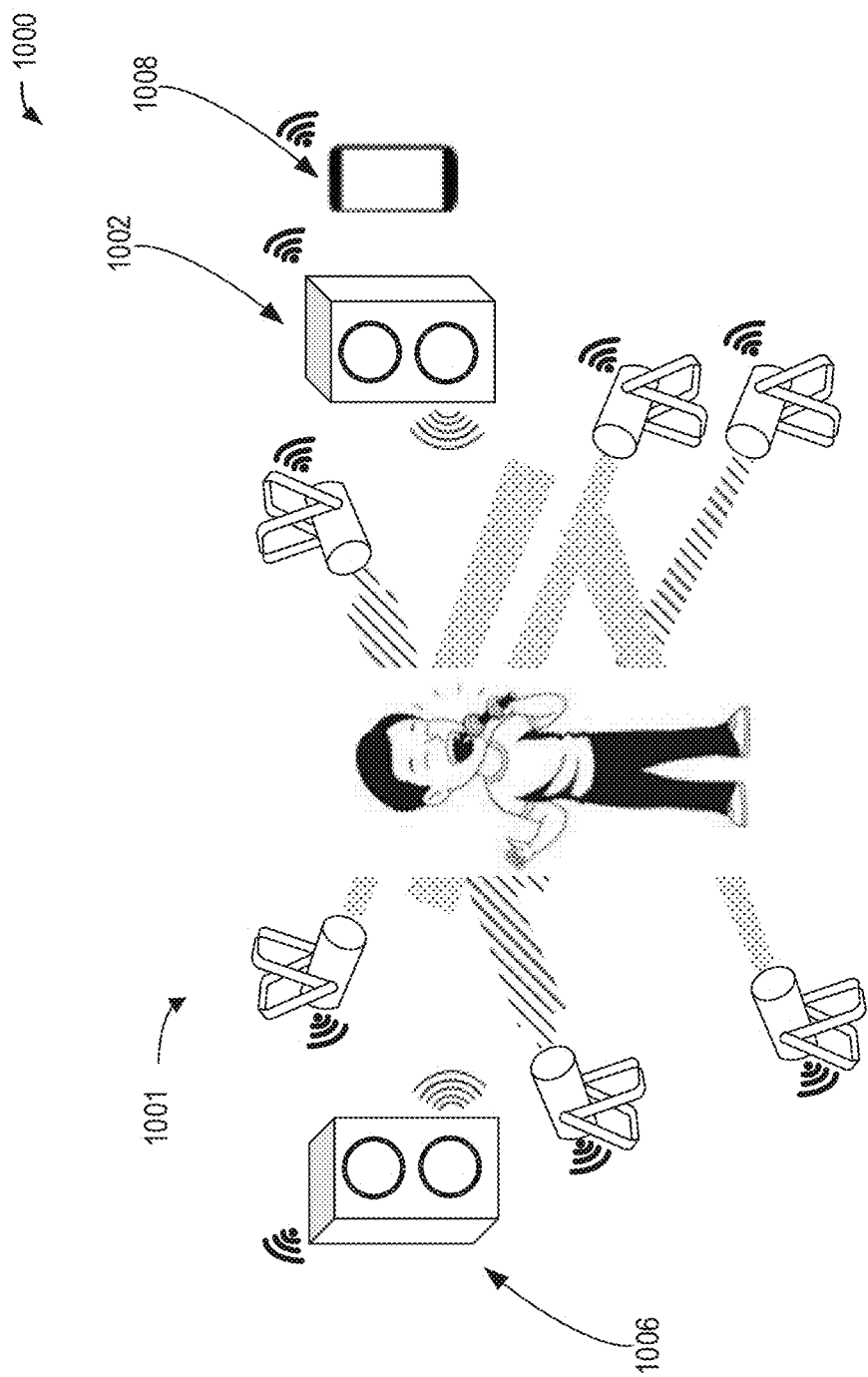
FIG. 10 shows another example configuration of a light show system including a plurality of speakers and a mobile device, according to at least one example of the present disclosure.

FIG. 10 is a view of a light show system 1000, including a master speaker 1002, a plurality of lights 1001, a dependent speaker 1006, and a mobile device 1008. The mobile device 1008 may include a smart phone, a tablet, a laptop computer, a portable media player, and/or any suitable mobile computing system. The mobile device 1008 may be connected to the master speaker 1002 and the plurality of lights 1001 via a communication link. The communication link may be wired or wireless, and may be configured to provide two-way communication between the mobile device 1008, the master speaker 1002, and the dependent speakers 1006. In the example of FIG. 10, the mobile device 1008 may transmit a MFF and/or a series of lighting adjustments to the master speaker 1002, and may further transmit a music file to the master speaker 1002. The master speaker 1002 may broadcast an automated light show to the plurality of dependent lights 1001 based on one or more music files and/or MFFs provided by the mobile device 1008, and may further broadcast a music file to the dependent speakers 1006. Further, a user may adjust parameters of the automated light show via mobile device 1008.

The master speaker 1002 comprises wireless communication capabilities, such as Wi-Fi, in order to communicate with the dependent speaker 1006 and the plurality of lights 1001. The master speaker 1002 may relay instructions from the mobile device 1008 with regard to a light show corresponding to a MFF to the plurality of lights 1001 while relaying an audio file to the dependent speaker 1006. Additionally or alternatively, the master speaker 1002 and the dependent speaker 1006 may comprise one or more lighting fixtures configured to provide further light sources for the light show.

Figure 11:
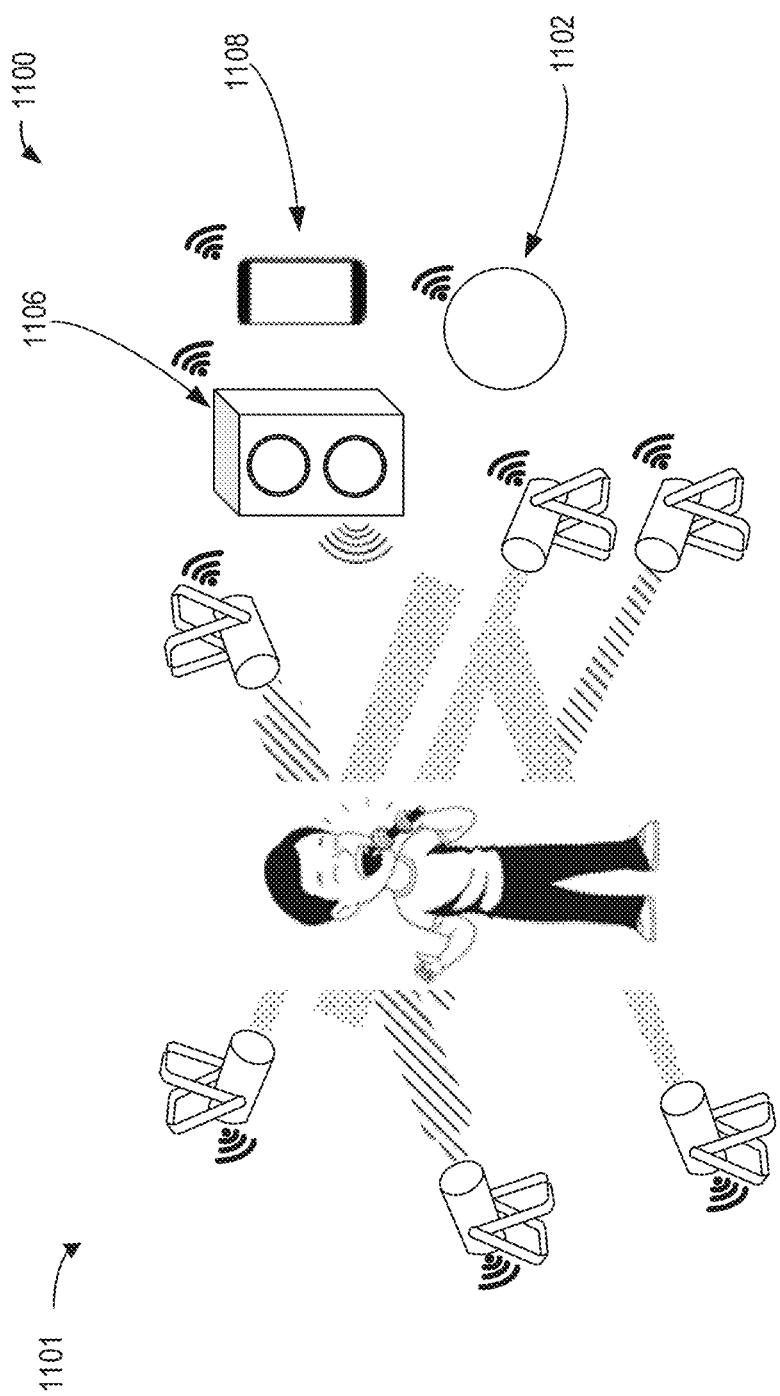
FIG. 11 shows an example configuration of a light show system including a plurality of speakers, a mobile device, and an Integrated Light Show Hub, according to at least one example of the present disclosure.

FIG. 11 is a view of a light show system 1100, including an Integrated Light Show Hub 1102, a plurality of dependent lights 1101, a dependent speaker 1106, and a mobile device 1108. In such a light show system, the Integrated Light Show Hub 1102 may be designated as the master. The mobile device 1108 may include a smart phone, a tablet, a laptop computer, a portable media player, and/or any suitable mobile computing system. The Integrated Light Show Hub 1102 may be connected to the mobile device 1108, the dependent speakers 1106, and the dependent lights 1101 via a communication link. The communication link may be wired or wireless, and configured to provide two-way communication between the Integrated Light Show Hub 1102, the dependent lights 1101, the dependent speakers 1106, and the mobile device 1108. In the example of FIG. 11, the mobile device 1108 may transmit a MFF and/or a music file to the Integrated Light Show Hub 1102. The Integrated Light Show Hub 1102 may broadcast an automated light show to the plurality of dependent lights 1101 based on one or more music files and/or MFFs provided by the mobile device 1108, and may further broadcast a music file to the dependent speakers 1106. Further, a user may adjust parameters of the automated light show via mobile device 1108. As another example, the Integrated Light Show Hub may receive a music signal via a microphone, and may generate a light show synchronized to the music signal in real-time.

Figure 12:
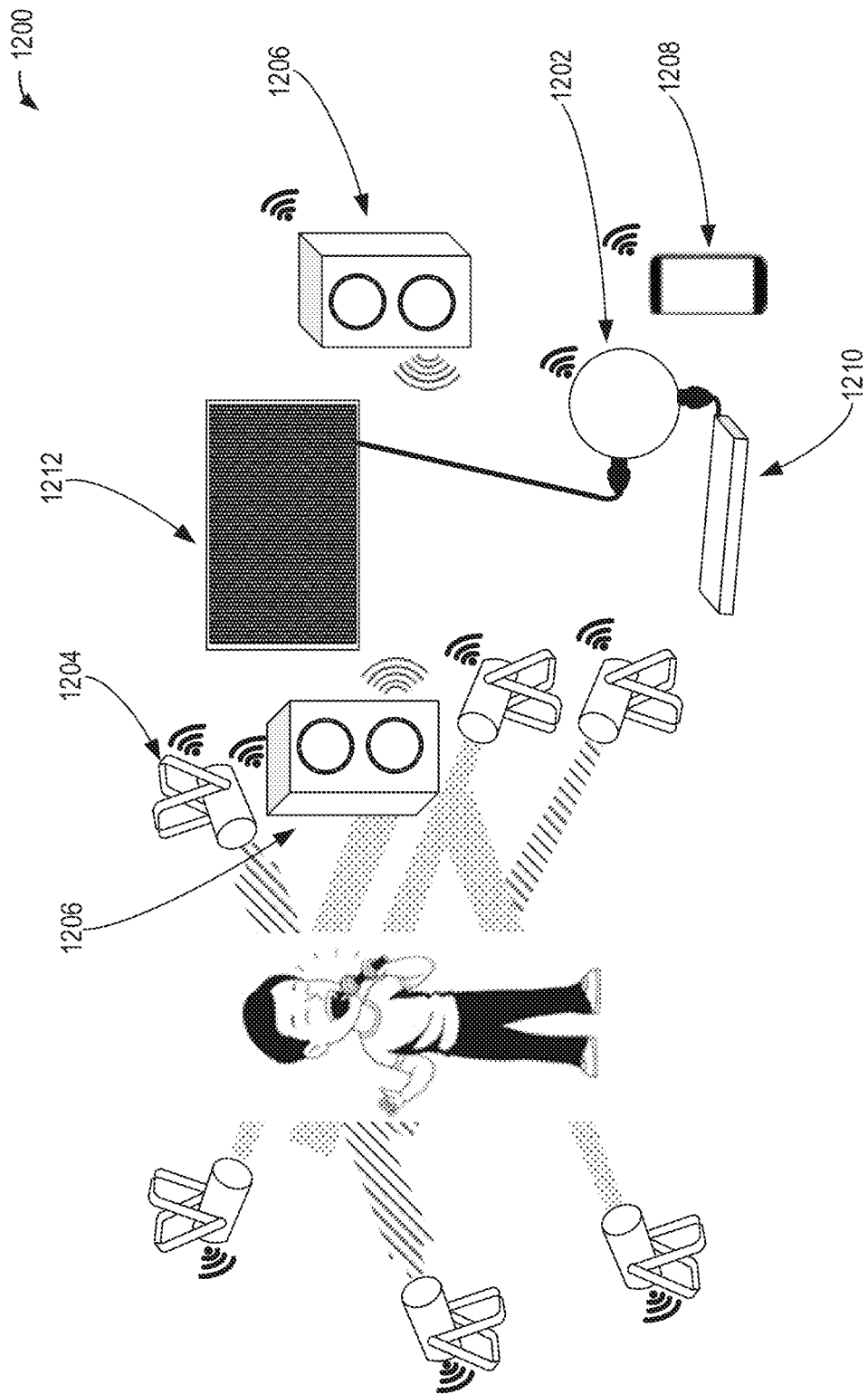
FIG. 12 shows an example configuration of a light show system including a plurality of speakers, a mobile device, a karaoke source, an Integrated Light Show Hub, and a display unit, according to at least one example of the present disclosure.

FIG. 12 shows a view of a light show system 1200, including an Integrated Light Show Hub 1202, a plurality of dependent lights 1204, a plurality of dependent speakers 1206, a mobile device 1208, a music source 1210, and a graphical display unit 1212. In the example of FIG. 12, the Integrated Light Show Hub 1202 may receive a music signal and a video signal from the music source 1210 via a HDMI communication link, and may further receive one or more user inputs from the mobile device 1208 via a communication link (e.g., a wired communication link or a wireless communication link). Further, the Integrated Light Show Hub 1202 may transmit a video signal to the graphical display unit 1212 via a HDMI communication link. Based on a music file from the music source 1210, the Integrated Light Show Hub may receive, download, or generate a MFF for providing a light show corresponding to the music file. For example, the Integrated Light Show Hub may generate the MFF according to the method 400 of FIG. 4. Further still, the Integrated Light Show Hub 1202 may transmit a sequence of lighting adjustments to the dependent lights 1204, and may transmit an audio signal to the dependent speakers 1206, according to the method described hereinabove with regard to FIG. 6. Thus, the Integrated Light Show Hub 1202 may broadcast an automated light show to the plurality of dependent lights 1204 based on one or more music files and/or MFFs provided by the mobile device 1208, and may further broadcast a music file to the dependent speakers 1206. Further, a user may adjust parameters of the automated light show via mobile device 1208.

According to the present disclosure, a light show may be improved based on a mapping of relative locations of light show components (e.g., lights, speakers, lighting controllers, mobile devices, and so on). For example, utilizing features in a BLUETOOTH protocol, such as an Angle of Arrival (AoA) and an Angle of Departure (AoD), it is possible to perform a two-dimensional and/or three-dimensional mapping of an enclosed space including a plurality of lights and speakers. As another example, mobile devices, such as smartphones, may include integrated motion sensors, such as microelectromechanical systems (e.g., MEMS), which may provide fast and reliable signals for characterizing motion. In particular, sensor fusion, which combines signals from a gyroscope, an accelerometer, and a compass, may accurately determine the position of a smartphone over time. A filtering algorithm, such as an algorithm including Kalman filtering, may be applied to improve an accuracy of the locations of the plurality of light and sound devices. In one example, a Zero Velocity Update (ZUPT) algorithm may be applied, for example.

FIG. 12 further illustrates the Integrated Light Show Hub 1202 being connected to a karaoke player 1212. In one example, the karaoke player 1212 may include a display device, such as a television, a projector, a monitor, or other display device. Additionally or alternatively, a media player 1210 may be connected to the Integrated Light Show Hub 1202. The media player 1210 may be configured to read CDs, videotapes, cassette tapes, DVDs, Blu-ray, and the like. The media player 1210 may transmit song data to the Integrated Light Show Hub 1202, wherein a MFF may be generated via the method of FIG. 4 and transmitted to one or more of the plurality of lights 1204 and the speakers 1206. In this way, the Integrated Light Show Hub 1202 may receive inputs from a plurality of devices and send outputs to a plurality of lights and speakers.

In one example, a user may use the mobile device 1208 of the Integrated Light Show Hub 1202 to adjust one or more settings of the light show, including color, sound, intensity, brightness, contrast, and the like.

Figure 13:
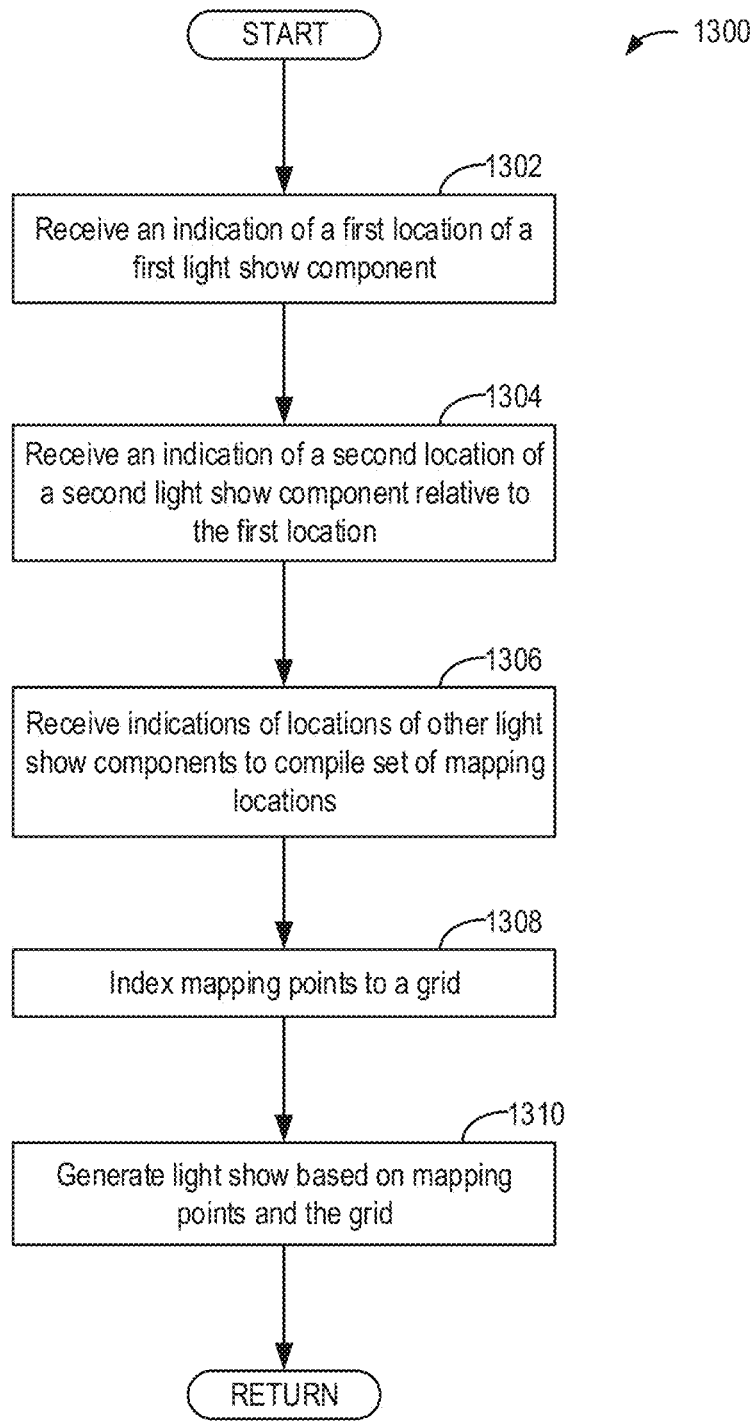
FIG. 13 shows a flow chart of a method for light mapping according to at least one example of the present disclosure.

FIG. 13 shows an example method 1300 for mapping locations of light show components, and adjusting an automated light show based on the locations of the light show components. By indexing locations of the light show components to locations of a mobile device including sensor fusion, a controller may build a virtual map of a light show system, including relative locations of a plurality of light show components. Based on the relative locations of the light show components, an automated light show may be adjusted to increase customer satisfaction. Method 1300 may be performed by a controller equipped with a plurality of sensors (e.g., an accelerometer, a gyroscope, a compass, GPS, and the like), such as a mobile device (e.g., a smartphone), which may be communicatively linked with one or more light show device (e.g., a "smart" speaker, an Integrated Light Show Hub, a light, a lighting controller, and so on). Further, each light show component may include a button. When the button of a component is depressed, the button may establish a communication link with the controller, and may further signal that a location of the component corresponds with a location of the mobile device. For example, when a button on a strobe-light is pressed, a controller may determine that a location of the mobile device corresponds to a location of the strobe-light. Note that method 1300 may be described with reference to FIGS. 14A-14D, which show views of a light show system during a light show component mapping. The light show systems of FIGS. 14A-14D are identical, and will be numbered identically. Components introduced in FIG. 14A will not be reintroduced in FIGS. 14B-14D.

At 1302, method 1300 includes receiving an indication of a first location of a first light show component. In one non-limiting example, a user may wirelessly connect via a mobile device to the first light show component and depress a button on the first light show component, while in physical proximity to the first light show component. Depressing the button on the first light show component may cause the wireless device to transmit its location to the controller. Responsive to receiving the location of the first light show component, the controller may establish a first mapping point. In the example embodiment of FIG. 14A, light show system 1400 includes a speaker 1402, a plurality of globe lights 1404, including a first globe light 1404a, and a plurality of spotlights 1406. A user 1408 and a smartphone 1410 are in physical proximity to the speaker 1402, which may be the first light show component, and may include a first button 1414. Speaker 1402 may be a "smart" device including at least one computing system, and may connect to other light show components and the smartphone 1410 via a communication link (e.g., a wireless or wired connection).

Figure 14A:
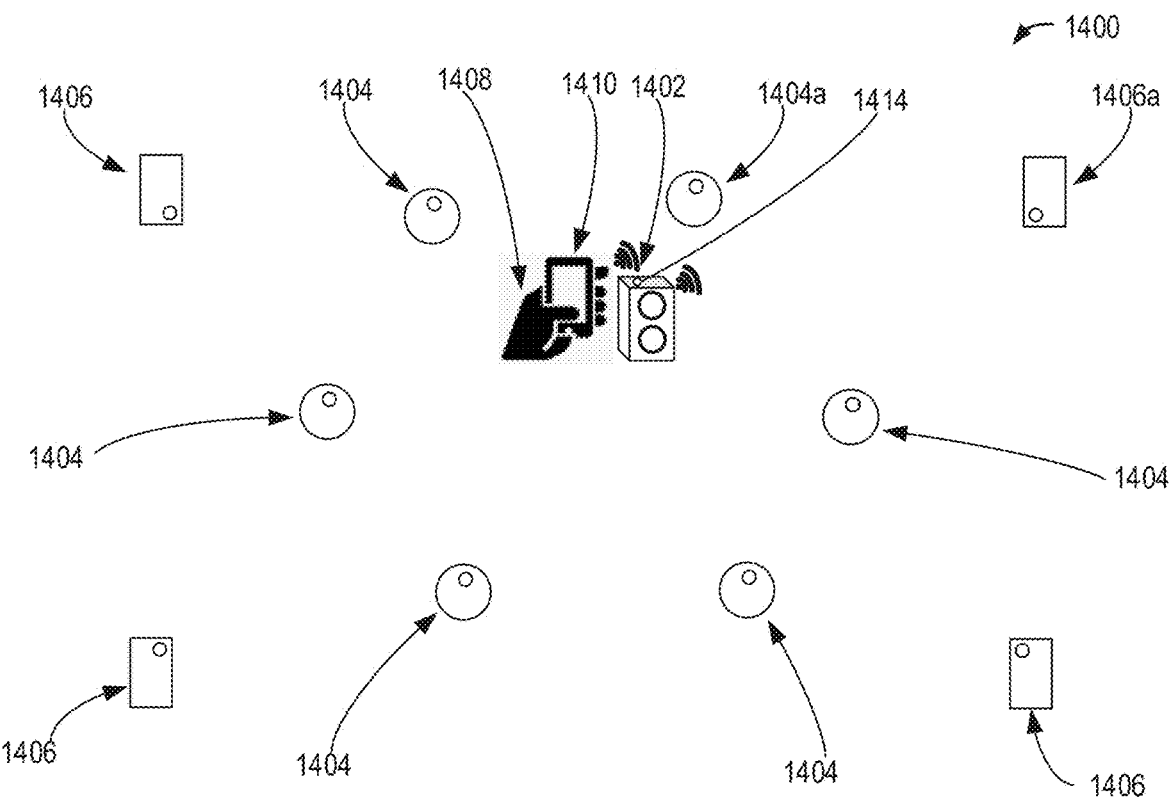
FIG. 14A shows a first view of an example light show system during light mapping, according to at least one example of the present disclosure.
Figure 14B:
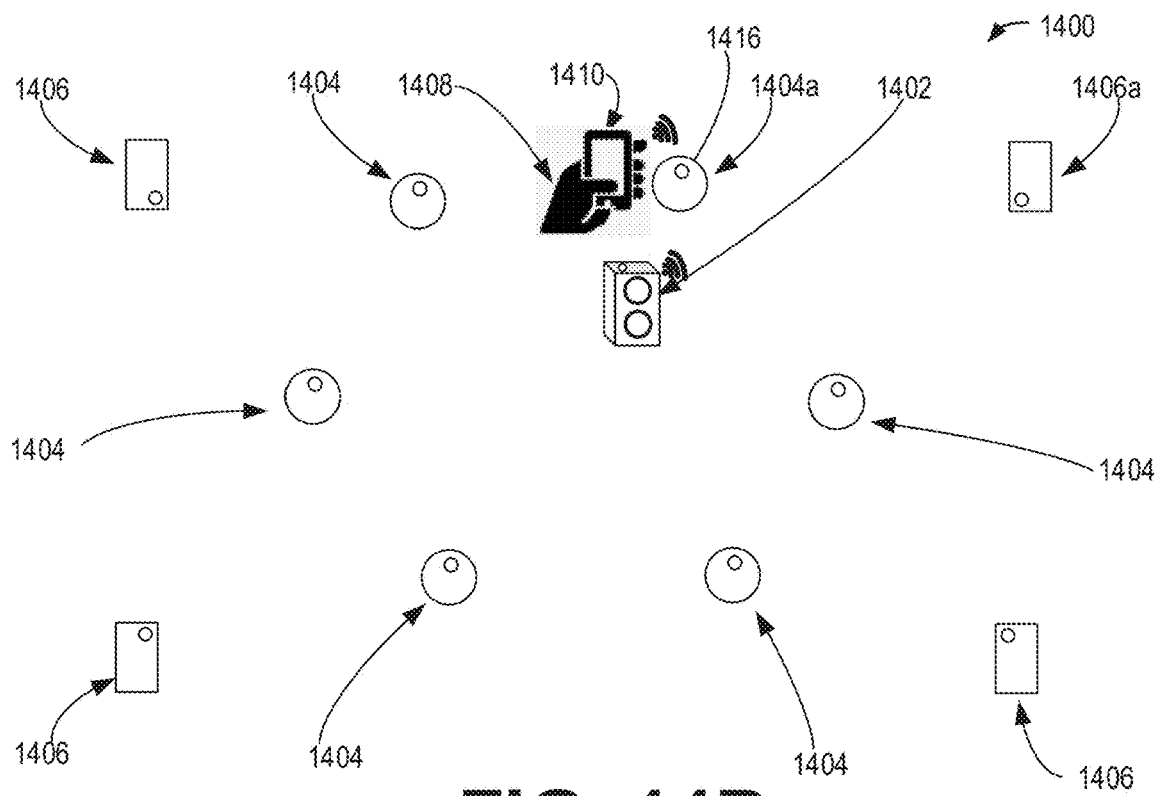
FIG. 14B shows a second view of the example light show system during light mapping, according to at least one example of the present disclosure.

At 1304, method 1300 includes receiving an indication of a second location of a second light show component relative to the first location. In one non-limiting example, the user may wirelessly connect to the first light show component and depress a button on a second light show component, while in physical proximity to the second light show component. Depressing the button on the second light show component may cause the wireless device to transmit its location to the controller. Responsive to receiving the location of the second light show component, the controller may establish a first mapping point. Further, using sensor fusion (e.g., integrated data from a gyroscope, an accelerometer, and a compass), method 1300 may determine a position of the second light show component relative to the first mapping point. The position of the second light show component relative to the first mapping point may be the second mapping point. An example light show system configuration during 1304 is shown graphically in FIG. 14B. In FIG. 14B, the user 1408, with the smartphone 1410, are in physical proximity to a first globe light 1404a, which may be the second light show component. Further, the first globe light 1404a includes a second button 1416.

Figure 14C:
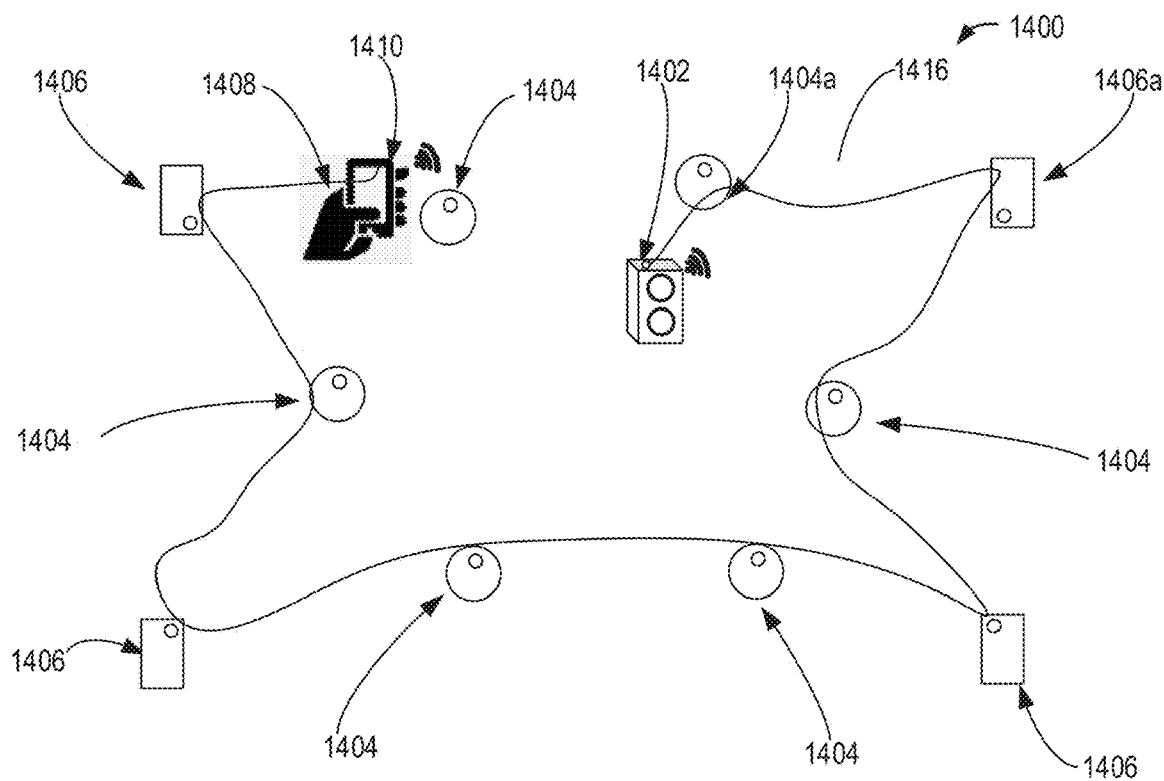
FIG. 14C shows a third view of the example light show system during light mapping, according to at least one example of the present disclosure.

At 1306, method 1300 includes receiving indications of locations of other light show components to compile a set of mapping locations. Thus, method 1300 may assemble a set of mapping points corresponding to the location of each light show component relative to the first light show component. As shown in FIG. 14C, a set of mapping points is determined based on the relative locations of each light show component received as the user 1408 interacts with each component while traversing a path 1416 around the light show system 1400. The set of mapping points may be stored in a non-volatile memory location in the controller, or may be stored in a remote server. For example, the computing system of the speaker 1402 may transmit the set of mapping points to smartphone 1410, which may store the mapping points in local memory, or may transmit the mapping points to a remote server for processing.

Figure 14D:
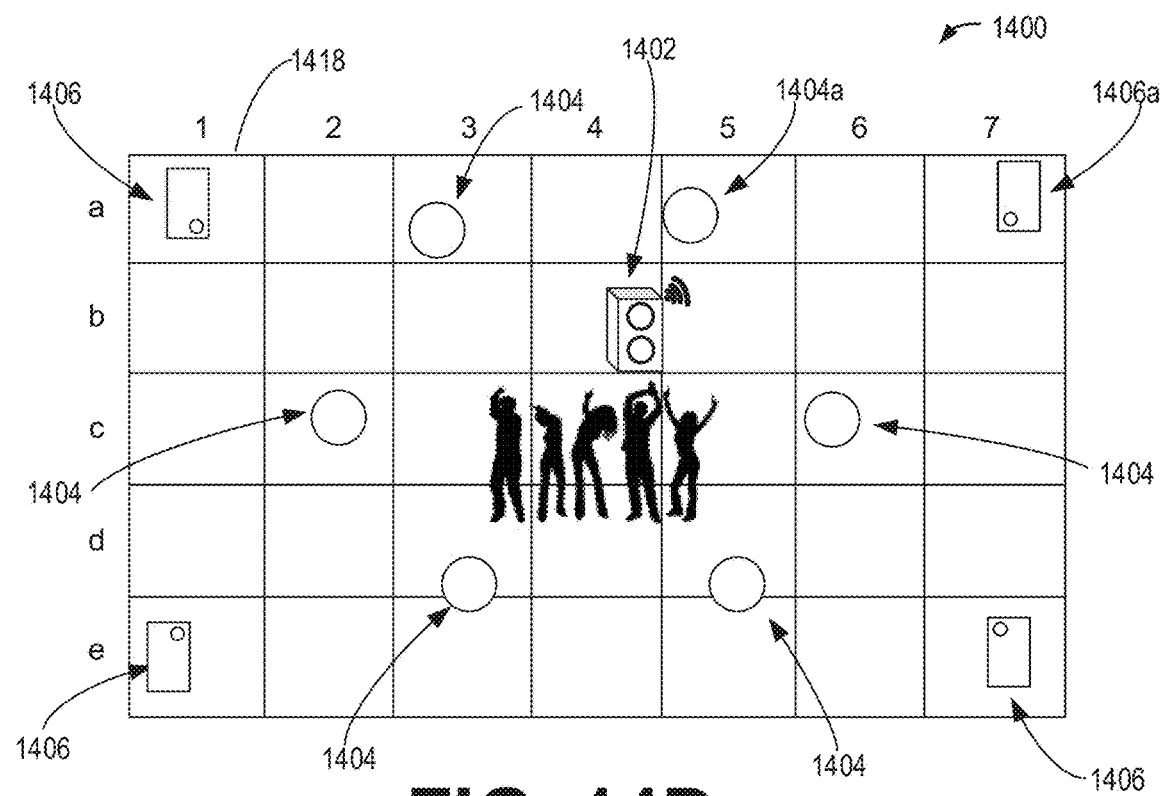
FIG. 14D shows a view of an example light show system after light mapping, according to at least one example of the present disclosure.

At 1308, method 1300 includes indexing the set of mapping points corresponding to the location of each light show component relative to the first light show component to a grid. For example, method 1300 may construct a virtual space, and may divide the virtual space into a number of cells, as shown in FIG. 14D. In some examples, the virtual space is three-dimensional, while in other examples, the virtual space is two-dimensional. As an example, the light show system 1400 of FIG. 14D includes a virtual space comprising a two-dimensional grid 1418 of cells, onto which the set of mapping points of FIG. 14C are assigned or indexed.

In this way, method 1300 may determine relative locations of a plurality of light show components, and may index these locations (e.g., mapping points) to a grid. The relative locations of the plurality of light show components may be transmitted to a lighting controller, such as the lighting controller 108 of FIG. 1.

Continuing at 1310, method 1310 generates a light show based on the mapping points and the grid. For example, the lighting controller may modify a sequence of adjustments to the plurality of light show components according to the relative locations of the light show components. For example, the lighting controller may adjust a light show component based on its location relative to one or more cells in the virtual space. As an example, the lighting controller may determine to illuminate cell A-5 of FIG. 14D by adjusting globe light 1404a, causing it to illuminate. As another example, the lighting controller may determine to illuminate cell B-6 of FIG. 14D by adjusting a direction and intensity of spotlight 1406a such that a beam of light from spotlight 1406a is directed at cell B-6. Such adjustments may be coordinated by the lighting controller in order to achieve a variety of aesthetically pleasing effects while providing an automated light show, which may increase customer satisfaction. In particular, the lighting controller may synchronize adjustments to lights in order to highlight a certain feature of a music file, which may further increase customer satisfaction during an automated lighting show. Such dynamic sequences of lighting adjustments may enhance the harmony of an audio-visual synthesis provided by the light show. Method 1300 then returns.

It should be appreciated that the various systems and methods referred to herein for providing an automated light show may be combined. For example, mapping may be provided in a system including an Integrated Light Show Hub, which may generate a MFF and provide an automated light show based on a digital or analog music signal.

In one embodiment, a method comprises generating a music feature file based on selected audio, the music feature file comprising metadata for the selected audio including a plurality of time markers indicating audio events in the selected audio, and automatically controlling one or more lights according to the music feature file.

In a first example of the method, the method further comprises outputting the selected audio to one or more speakers, and synchronizing the automatic control of the one or more lights according to the music feature file with the output of the selected audio. In a second example of the method optionally including the first example, automatically controlling the lights according to the music feature file includes adjusting one or more of a color, state, beam movement, and intensity of the one or more lights based on one or more characteristics of the selected audio stored as the metadata of the music feature file. In a third example of the method optionally including one or more of the first and second examples, the metadata for the selected audio further includes a genre of the selected audio. In a fourth example of the method optionally including one or more of the first through third examples, the music feature file further comprises the selected audio. In a fifth example of the method optionally including one or more of the first through fourth examples, the music feature file further comprises a synchronized video file. In a sixth example of the method optionally including one or more of the first through fifth examples, the selected audio comprises an analog signal including the selected audio. In a seventh example of the method optionally including one or more of the first through sixth examples, the method further comprises receiving the selected audio from a remote streaming server, and generating the music feature file while receiving the selected audio. In an eighth example of the method optionally including one or more of the first through seventh examples, the selected audio comprises a music file stored in a memory of a controller. In a ninth example of the method optionally including one or more of the first through eighth examples, the method further comprises receiving a position for each of the one or more lights in a light show environment, mapping the position for each of the one or more lights to a grid corresponding to the light show environment, and further adjusting control of the one or more lights based on the mapped position for the one or more lights in the grid. In a tenth example of the method optionally including one or more of the first through ninth examples, the position for each of the one or more lights in a light show environment is determined based on a signal from a motion sensing device. In an eleventh example of the method optionally including one or more of the first through tenth examples, the motion sensing device is a mobile phone including BLUETOOTH. In a twelfth example of the method optionally including one or more of the first through eleventh examples, the motion sensing device is a mobile phone including a plurality of sensors.

In another embodiment, a light show system comprises a plurality of lights, and a controller communicatively coupled to the plurality of lights and configured with instructions stored in non-transitory memory that when executed by a processor of the controller cause the controller to control one or more lights of the plurality of lights based on a music feature file for a selected audio.

In a first example of the system, the system further comprises one or more speakers communicatively coupled to the controller, wherein the controller is further configured with instructions that when executed cause the controller to output the selected audio to the one or more speakers while controlling the one or more lights of the plurality of lights based on the music feature file for the selected audio. In a second example of the system optionally including the first example, the controller is further configured with instructions that when executed cause the controller to: receive a second selected audio; retrieve a second music feature file for the second selected audio; and control one or more of the plurality of lights based on the second music feature file while outputting the second selected audio to the one or more speakers. In a third example of the system optionally including one or more of the first and second examples, the controller is further configured with instructions that when executed cause the controller to control one or more of the plurality of lights based on the music feature file and the second music feature file while transitioning between outputting the selected audio and the second selected audio to the one or more speakers. In a fourth example of the system optionally including one or more of the first through third examples, the plurality of lights are distributed throughout a light show environment, and the controller is further configured with instructions that when executed cause the controller to: receive a position of each light of the plurality of lights within the light show environment; map the position of each light to a virtual grid corresponding to the light show environment; and adjust control of the one or more lights based on the music feature file and the mapped position of each light in the virtual grid. In a fifth example of the system optionally including one or more of the first through fourth examples, the position of each light of the plurality of lights within the light show environment is determined based on a signal from a motion sensing device, the motion sensing device including a plurality of sensors.

The description of embodiments has been presented for purposes of illustration and description. Suitable modifications and variations to the embodiments may be performed in light of the above description or may be acquired from practicing the methods. For example, unless otherwise noted, one or more of the described methods may be performed by a suitable device and/or combination of devices, such as the vehicle systems and cloud computing systems described above with respect to FIGS. 1-14D. The methods may be performed by executing stored instructions with one or more logic devices (e.g., processors) in combination with one or more hardware elements, such as storage devices, memory, hardware network interfaces/antennas, switches, actuators, clock circuits, and so on. The described methods and associated actions may also be performed in various orders in addition to the order described in this application, in parallel, and/or simultaneously. The described systems are exemplary in nature, and may include additional elements and/or omit elements. The subject matter of the present disclosure includes all novel and non-obvious combinations and sub-combinations of the various systems and configurations, and other features, functions, and/or properties disclosed.

As used in this application, an element or step recited in the singular and proceeded with the word "a" or "an" should be understood as not excluding plural of said elements or steps, unless such exclusion is stated. Furthermore, references to "one embodiment" or "one example" of the present disclosure are not intended to be interpreted as excluding the existence of additional embodiments that also incorporate the recited features. The terms "first," "second," "third," and so on are used merely as labels, and are not intended to impose numerical requirements or a particular positional order on their objects. The following claims particularly point out subject matter from the above disclosure that is regarded as novel and non-obvious.

The invention claimed is:

1. A method carried out by a processor, comprising:
receiving a request to perform a music show for a selected audio;
analyzing, with the processor, the selected audio;
in response to the request, determining that a music feature file for the selected analyzed audio is not available, and in response, generating, via the processor, a music feature file for the selected analyzed audio, including generating, via the processor, metadata based on the analyzed selected audio, the metadata including song events of the selected analyzed audio and trigger beats that index the song events to a timeline, and a timing for one or more lights corresponding to the trigger beats and the song events, and saving the metadata according to a music feature file protocol; and
automatically controlling the one or more lights according to the metadata in the music feature file.

2. The method of claim 1, further comprising outputting the selected audio to one or more speakers, and synchronizing automatic control of the one or more lights according to the music feature file with output of the selected audio, wherein the selected audio is a compressed audio file.

3. The method of claim 1, wherein automatically controlling the one or more lights according to the music feature file includes adjusting one or more of a color, a state, a beam movement, and an intensity of the one or more lights based on the metadata of the music feature file.

4. The method of claim 1, wherein analyzing includes determining song metadata including a length, a tempo, a genre, and a plurality of song events, and wherein generating the metadata comprises generating the metadata using one or more predictive learning algorithms to determine features of the selected audio.

5. The method of claim 4, wherein the music feature file further comprises the selected audio, wherein the music feature file comprises a plurality of discrete packets, each packet including an entirety of the metadata, and wherein as the tempo increases, more lights are activated and/or intensity of activated lights is increased.

6. The method of claim 1, wherein the music feature file further comprises a synchronized video file, wherein the selected audio is input into one or more look-up tables, functions, or algorithms, to output the metadata.

7. The method of claim 1, wherein the selected audio comprises an analog signal including the selected audio.

8. The method of claim 1, further comprising receiving the selected audio from a remote streaming server, and generating the music feature file while receiving the selected audio.

9. The method of claim 1, wherein the selected audio comprises a music file stored in a memory of a controller.

10. The method of claim 1, further comprising receiving a position for each of the one or more lights in a light show environment, mapping the position for each of the one or more lights to a grid corresponding to the light show environment, and further adjusting control of the one or more lights based on the position mapped for the one or more lights in the grid.

11. The method of claim 10, wherein the position for each of the one or more lights in the light show environment is determined based on a signal from a motion sensing device.

12. The method of claim 11, wherein the motion sensing device is a mobile phone including BLUETOOTH.

13. The method of claim 11, wherein the motion sensing device is a mobile phone including a plurality of sensors.

14. A light show system, comprising:
a plurality of lights; and
a controller communicatively coupled to the plurality of lights and configured with instructions stored in non-transitory memory that when executed by a processor of the controller cause the controller to:
responsive to determining that a music feature file for a selected audio file is not available, generate a music feature file for the selected audio file, the music feature file generated based on the selected audio file, the music feature file comprising metadata for the selected audio file including a plurality of time markers indicating audio events in the selected audio file, the metadata including song events and trigger beats that index song events of the selected audio file to a timeline, and a timing for one or more lights corresponding to the trigger beats and the song events, the music feature file being a file protocol, and
control one or more lights of the plurality of lights based on the music feature file,
wherein the plurality of lights is distributed throughout a light show environment, and wherein the controller is further configured with instructions that when executed cause the controller to:
receive a position of each light of the plurality of lights within the light show environment;
map the position of each light to a virtual grid corresponding to the light show environment; and
adjust control of the one or more lights based on the music feature file and the mapped position of each light in the virtual grid, wherein the position of each light of the plurality of lights within the light show environment is determined based on a signal from a motion sensing device, the motion sensing device including a plurality of sensors, including to modify a sequence of adjustments to lights according to relative locations of the lights, including to adjust a light based on its location relative to one or more cells in the virtual grid.

15. The system of claim 14, further comprising one or more speakers communicatively coupled to the controller, wherein the controller is further configured with instructions that when executed cause the controller to output the selected audio to the one or more speakers while controlling the one or more lights of the plurality of lights based on the music feature file for the selected audio file.

16. The system of claim 14, wherein the selected audio file is a first audio file, and wherein the controller is further configured with instructions that when executed cause the controller to:
receive a second selected audio file;
retrieve a second music feature file for the second selected audio file; and
control one or more of the plurality of lights based on the second music feature file while outputting the second selected audio file to the one or more speakers.

17. The system of claim 16, wherein the controller is further configured with instructions that when executed cause the controller to control one or more of the plurality of lights based on the music feature file and the second music feature file while transitioning between outputting the first selected audio file and the second selected audio file to the one or more speakers.

18. A system, comprising:
a plurality of lights and a plurality of speakers arranged in a light show environment; and
a controller with computer-readable instructions stored on non-transitory memory thereof that when executed enable the controller to:
generate, in real-time, a music feature file including metadata in real-time, based on streaming audio data received in real-time from a device, wherein the metadata comprises one or more of a plurality of song events, a timing, a plurality of trigger beats, a genre, a time signature, a number of beats per minute, and a musical key of the streaming audio data, where the music feature file is generated as the streaming audio data is received;
signal to the plurality of lights to adjust one or more of a color, an intensity, a pulsation, and a brightness based on the metadata; and
signal to the plurality of speakers to play audio based on an audio file of the audio data, wherein the signaling to the plurality of lights to adjust one or more of a color, an intensity, a pulsation, and a brightness based on the metadata is performed while the streaming audio data is received.

19. The system of claim 18, wherein signaling to the plurality of lights to adjust one or more of the color, the intensity, the pulsation, and the brightness based on the music feature file metadata comprises signaling to the plurality of lights to adjust one or more of the color, the intensity, the pulsation, and the brightness based on the metadata and based on one or more user inputs.

\* \* \* \* \*